(12) United States Patent
Sugita et al.

(10) Patent No.: US 8,132,785 B2
(45) Date of Patent: Mar. 13, 2012

(54) SHAFT SEAL PACKING AND SHAFT SEAL STRUCTURE FOR VALVE

(75) Inventors: Yasunori Sugita, Yamanashi (JP); Yoshihiro Yamashita, Yamanashi (JP)

(73) Assignee: Kitz Corporation, Chiba (JP)

( * ) Notice: Subject to any disclaimer, the term of this patent is extended or adjusted under 35 U.S.C. 154(b) by 544 days.

(21) Appl. No.: 12/309,078

(22) PCT Filed: Jul. 11, 2007

(86) PCT No.: PCT/JP2007/063789
§ 371 (c)(1),
(2), (4) Date: Jan. 6, 2009

(87) PCT Pub. No.: WO2008/007685
PCT Pub. Date: Jan. 17, 2008

(65) Prior Publication Data
US 2009/0289423 A1 Nov. 26, 2009

(30) Foreign Application Priority Data

Jul. 12, 2006 (JP) ................................ 2006-191720

(51) Int. Cl.
*F16J 15/00* (2006.01)
(52) U.S. Cl. ......... 251/214; 277/516; 277/522; 277/530
(58) Field of Classification Search ................ 251/214, 251/304, 315.01; 277/516, 522, 530
See application file for complete search history.

(56) References Cited

U.S. PATENT DOCUMENTS 591,670 A * 10/1897 Law ............................. 277/530
(Continued)

FOREIGN PATENT DOCUMENTS
EP 1 201 974 5/2002
(Continued)

OTHER PUBLICATIONS

International Search Report issued Aug. 14, 2007 in the International (PCT) Application of which the present application is the U.S. National Stage.

(Continued)

*Primary Examiner* — John Bastianelli
(74) *Attorney, Agent, or Firm* — Wenderoth, Lind & Ponack, L.L.P.

(57) ABSTRACT

A shaft seal packing exhibits high sealability at the time of initial assembly and also exhibits, even after the packing is retightened, excellent sealability by an increased seal surface pressure obtained through an effect of pressing and by self-sealability obtained through an effect of fluid pressure. A shaft seal structure for a valve includes a body for a valve, a valve shaft, a valve disc disposed within the body so as to be rotatable or capable of ascending and descending, a valve shaft seal chamber having the valve shaft axially attached thereto, a shaft seal packing that is attached to the shaft seal chamber and comprises annular packing bodies stacked and substantially V-shaped in cross section, with stacked layer faces on the inner-diameter side of the packing bodies brought into tight contact with one another and stacked layer faces on the outer-diameter side of the packing bodies formed with prescribed gaps between the adjacent stacked layer faces. In the shaft seal structure for a valve, a tightening load on the packing bodies and fluid pressure are converted to a force in the diametrical direction owing to inclined angles of stacked layer faces on the inner-diameter side to attain a seal by a surface contact between the inner peripheral surface on the inner-diameter side and the outer peripheral surface of the valve shaft on a sliding side, and a lip part on the outer-diameter side is pushed and spread owing to the gaps to attain a seal by a line contact with the shaft seal chamber on a fixed side.

12 Claims, 17 Drawing Sheets

U.S. PATENT DOCUMENTS

| | | | | |
|---|---|---|---|---|
| 2,864,631 | A | * 12/1958 | Kemp | 277/346 |
| 2,900,201 | A | * 8/1959 | Salmon et al. | 277/530 |
| 4,300,776 | A | 11/1981 | Taubenmann | |
| 4,489,916 | A | * 12/1984 | Stevens | 251/214 |
| 4,886,241 | A | * 12/1989 | Davis et al. | 251/214 |
| 5,056,758 | A | * 10/1991 | Bramblet | 251/214 |
| 5,131,666 | A | * 7/1992 | Hutchens | 277/523 |
| 5,201,532 | A | * 4/1993 | Salesky et al. | 277/530 |
| 5,478,048 | A | * 12/1995 | Salesky et al. | 251/214 |
| 5,593,166 | A | | 1/1997 | Lovell et al. |
| 5,938,173 | A | | 8/1999 | Hayakawa |

FOREIGN PATENT DOCUMENTS

| | | |
|---|---|---|
| JP | 39-762 | 1/1964 |
| JP | 45-28813 | 11/1970 |
| JP | 63-030665 | 2/1988 |
| JP | 5-19735 | 3/1993 |
| JP | 8-021537 | 1/1996 |
| JP | 8-145187 | 6/1996 |
| JP | 9-509726 | 9/1997 |
| JP | 10-231823 | 9/1998 |
| JP | 2006-064111 | 3/2006 |

OTHER PUBLICATIONS

Supplementary European Search Report issued May 19, 2011 in corresponding European Application No. 07 79 0593.

* cited by examiner (a)

(b)

(a)

(b)

(a)

(b)

(c)

(a)

(b)

(c)

(a)

(b)

(a)

(b)

(c)

SHAFT SEAL PACKING AND SHAFT SEAL STRUCTURE FOR VALVE

BACKGROUND OF THE INVENTION

I. Technical Field

The present invention relates to a shaft seal packing enhanced in shaft seal performance and to a shaft seal structure for a valve, such as a ball valve or gate valve, organically enhanced in seal performance at dynamic and static parts of a shaft seal section of the valve and in slidability at the dynamic part.

II. Description of the Related Art

Conventionally, for example, a ball valve comprises a valve disc, such as a ball valve disc, for controlling a fluid and a stem for operating the valve disc and, since the rotation of the stem makes an opening/closing operation, the stem has a rotation part required to have a seal mechanism. The seal mechanism of the stem rotation part requires the frictional force exerted by the rotation of the stem to be reduced and is required to have a function of maintaining the sealability with the stem or a body. Also, in an ascending/descending valve, such as a gate valve, it is necessary to reduce the frictional force exerted during ascending and descending and similarly maintain the sealability. To satisfy these, for a seal at a stem-mounted part a molded packing made of a resin (fluorine resins, such as PTFE) is generally used.

The packing is formed of a resin into a V-shape in cross section and attached to the inside of a valve in a stacked manner to add to a tightening force and enhance the sealability. In addition, the packing has a structure to fulfill a sealing force called self-sealability that automatically performs tight stoppage when a fluid has acted on the stem and the inner wall of the body.

As the valve using the V-shaped packing, a ball valve described in JP-A HEI 10-231823 can be cited. The ball valve has a substantially cylindrical V-shaped packing attached between a stem and a body. Similarly to the ball valve of JP-A HEI 10-231823, a ball valve 1 shown in FIG. 18 has a general structure using a V-shaped packing made of a resin, such as PTFE.

In this ball valve 1, the pressing force of a stem part 4 in the axial direction obtained through tightening a bolt-nut assembly 2 presses a gland 9 to press an annular packing 3 disposed at a lower side via the gland 9. The annular packing 3 converts, at a mountain-shaped tapered face part 3a V-shaped in cross section, the axial-direction pressing force into a radial-direction pressing force to heighten surface pressure relative to the stem part 4 or a sidewall 5a of a packing storage chamber 5, thereby attaining a sealing effect. In addition, a fluid is guided to the annular packing 3 and received at a valley-shaped tapered face part 3b V-shaped in cross section to push the annular packing 3 radially and heighten the surface pressure relative to the stem part 4 or sidewall 5a owing to the fluid pressure, thereby attaining the sealing effect by self-sealability.

To be specific, in FIG. 19(a), the annular packing having a mountain-side taper angle α of 47.5° formed from the normal of the mountain-shaped tapered face part 3a and a valley-side taper angle β of 45° formed from the normal of the valley-shaped tapered face part 3b, for example, is attached between an upper adapter 6 having a valley-shaped tapered face part 6a of the same angle as mentioned above and a lower adapter 7 having a mountain-shaped tapered face part 7a of the same angle as mentioned above to constitute a stacked ring 8. By means of each angle difference of 2.5°, gaps S are formed on the inner-diameter and outer-diameter sides at an initial time of pressing the stacked ring 8, with the apexes as their centers, between the upper adapter 6 and the annular packing 3 and between the lower adapter 7 and the packing 3.

In the annular packing 3 and upper adapter 6, edge parts $3b_1$ and $6a_1$ on the inner and outer peripheral sides of the respective valley-shaped tapered face parts 3b and 6a come into contact with the mountain-shaped tapered face parts 3a and 7a, respectively, of the annular packing 3 and lower adapter 6 disposed on the lower side in the drawing and, when the bolt-nut assembly 2 has been tightened, the edge parts $3b_1$ and $6a_1$ are pressed toward the sides of the stem part 3 and packing storage chamber 5, respectively, to form contact seals.

Also, in FIG. 19(b), when retightening the bolt-nut assembly 2 shown in FIG. 18, the mountain-shaped tapered face parts 3a and 7a and the valley-shaped tapered face parts 3b and 6a of the stacked ring 8 are urged to come into intimate contact with each other over the entire surfaces thereof. At this time, the edge parts $3b_1$ and $6a_1$ on the inner and outer peripheral sides of the valley-shaped tapered face parts 3b and 6a are deformed as projecting slightly toward the inner-diameter and outer-diameter sides, respectively, and parts thus deformed are pressed against and brought into intimate contact with the stem part 4 and packing storage chamber 5. Thus, the retightening of the bolt-nut assembly enables the sealability to be enhanced.

In the meantime, in FIG. 19(c), when a fluid flows within the ball valve 1, the fluid pressure received by the ball valve produces a force acting to lift the lower adapter 7. Though this force is exerted in the axial direction, the tapered face parts 3a, 3b, 6a and 7a of the stacked ring 8 convert the force to loads in the diametrical direction (on the inner-diameter and outer-diameter sides). As a result, the stacked ring 8 is pressed against the outer peripheral surface of the stem part 4 and packing storage chamber 5 to form seals. Thus, the stacked ring 8 on which the fluid pressure has been exerted exercise its self-sealability to form seals.

In the upper adapter 6, annular packing 3 and lower adapter 7 constituting the stacked ring 8, since the mountain-side taper angle α and valley-side taper angle β are equal on the outer-diameter and inner-diameter sides, the mountain-shaped taper face parts 3a and 7a and valley-shaped taper face parts 3b and 6a when receiving the fluid pressure are uniformly deformed symmetrically from the center sections to narrow the gaps S in the stacked ring 8. At this time, the stacked ring 8 is deformed as pushed radially to bring the distal end sections thereof on the inner-diameter and outer-diameter sides to a contact seal state relative to the outer peripheral surface of the stem part 4 and packing storage chamber 5. That is to say, the contact seal is formed by means of a so-called lip effect (sealing effect by line contact).

Patent Document 1:

SUMMARY OF THE INVENTION

However, since the ball valves described in JP-A HEI 10-231823 and shown in FIG. 18 are retained in a state in which the shaft seal structure of the stacked layer ring 8 has been pressed through use thereof over a long period of time, the members constituting the stacked layer ring 8 are deformed by stress to possibly induce a so-called creep phenomenon by which the deformed sections creep into gaps between themselves and the stem part 4 or the packing storage chamber sidewall 5a or the gaps S in the stacked layer ring 8.

In addition, when a fluid or the surrounding area thereof has a high temperature, the stacked layer ring 8 becomes to also have a high temperature to thereby expand entirely. This expansion causes the creep phenomenon to further proceed and makes the stacked layer ring soft to be brought into a state easy to wear away. To the contrary, when the fluid or the surrounding area thereof has a low temperature (−30° C., for example), the stacked layer ring 8 becomes to also have a low temperature to thereby shrink entirely and cause the gaps in the shaft seal section to become large with ease. Since the stacked layer ring retained at low temperatures embraces the stem part 4 from the periphery thereof, the surface pressure on the side of the stem part 4 inevitably becomes higher than on the side of the packing storage chamber sidewall 5a. When packing surface pressure is applied onto the stem part 4 and packing storage chamber sidewall 5a at normal temperature (about 30° C.) to exert a frictional force thereon, since the frictional force on the side of the packing storage chamber sidewall 5a having a larger peripheral length and having a larger area of contact with the stacked layer ring 8 becomes larger, only the stem part 4 can rotate. In the state of such a low temperature, however, the friction resistance on the side of the packing storage chamber sidewall 5a becomes small to rotate the stacked layer ring 8 following the rotation of the stem part 4 and cause the outer periphery that is the fixed portion in nature to slide, thereby possibly lowering the seal performance. Thus, the stacked layer ring 8 easily induces thermal expansion and thermal shrinkage owing to the temperature variation of the fluid or the surrounding area thereof to adversely affect the sealability thereof.

As a result of the volume variation by the creep phenomenon or thermal expansion and thermal shrinkage phenomena, the stacked layer ring 8 possibly induces a so-called stress relaxation phenomenon by which the surface pressure required for sealing relative to the body side and stem side is lowered. For this reason, the valve using this kind of packing is required to perform retightening of the bolt-nut assembly for pressing the stacked layer ring 8.

However, when the bolt-nut assembly 2 is retightened unduly, the gaps S in the stacked layer ring 8 are narrowed and possibly fail to exist as shown in FIG. 19(c). Thus, the conventional annular packing 3 is provided on the inner and outer peripheral sides thereof with the gaps S in the packing and, since the packing is deformed to fill the gaps S when the retightening has been performed, the retightening effect has its own limits. In addition, since the packing exhibits a large variation in dimension in its height direction, it becomes difficult to restore its seal surface pressure relative to the stem part 4 or packing storage chamber 5. Furthermore, since the annular packing 3 has an extremely small part on which the fluid pressure is exerted, it entails the problems in that the lip effect by the edge parts $3b_1$ and $6a_1$ are difficult to fulfill and in that the self-sealability thereof is difficult to acquire.

The present invention has been developed in order to solve the conventional problems and the object thereof is to provide a shaft seal packing that fulfills high sealability at a time of initial assembly and, even after retightening, enhances seal surface pressure by pressing and fulfills self-sealability by fluid pressure to enable excellent sealability to be secured.

To attain the above object, the invention relates to a shaft seal packing comprising annular packing bodies stacked and substantially V-shaped in cross section, with stacked layer faces on an inner-diameter side of the packing bodies brought into tight contact with one another and stacked layer faces on an outer-diameter side of the packing bodies formed with prescribed gaps between adjacent stacked layer faces.

The invention relates to the shaft seal packing, wherein upper and lower stacked layer faces on the outer-diameter side of the packing bodies have different tapered angles to form the gaps.

The invention relates to the shaft seal packing, wherein a valley-side apex of each of the packing bodies is deviated from a mountain-side apex of thereof in an outer-diameter direction to make the mountain-side and valley-side apexes eccentric.

The invention relates to the shaft seal packing, wherein a mountain-side angle that is the tapered angle of the upper stacked layer face on the outer-diameter side of each of the packing bodies is in a range of 42.5° to 50°, a valley-side angle that is the tapered angle of the lower stacked layer face on the outer-diameter side thereof is in a range of 40° to 47.5°, and a relation of the mountain-side angle>the valley-side angle is satisfied.

The invention relates to the shaft seal packing, further comprising a top adapter and a bottom adapter stacked on top and bottom sides of the stacked packing bodies, respectively, to constitute a shaft seal packing and wherein a valley side of the top adapter and a mountain side of the bottom adapter have same angles as the packing bodies.

The invention relates to a valve shaft structure for a valve, comprising a body for a valve, a valve shaft, a valve disc disposed within the body so as to be rotatable or capable of ascending and descending, a valve shaft seal chamber having the valve shaft axially attached thereto, a shaft seal packing that is attached to the shaft seal chamber and comprises annular packing bodies stacked and substantially V-shaped in cross section, with stacked layer faces on an inner-diameter side of the packing bodies brought into tight contact with one another and stacked layer faces on an outer-diameter side of the packing bodies formed with prescribed gaps between adjacent stacked layer faces.

The invention relates to the valve shaft structure for a valve, wherein a tightening load on the packing bodies and fluid pressure are converted to a force in a diametrical direction owing to inclined angles of stacked layer faces on an inner-diameter side to attain a seal by a surface contact between an inner peripheral surface on an inner-diameter side and an outer peripheral surface of the valve shaft on a sliding side, and a lip part on an outer-diameter side is pushed and spread owing to the gaps to attain a seal by a line contact with the shaft seal chamber on a fixed side.

The invention relates to the valve shaft structure for a valve, wherein the valve is a ball valve that has a through hole and is rotatable via the valve shaft, and the valve shaft packing is attached to the valve shaft seal chamber having the valve shaft attached thereto by means of a tightening load given via a gland washer.

The invention relates to the valve shaft structure for a valve, wherein the gland washer is a conical disc spring washer and, with the washer, a surface pressure between an outer-diameter side of the shaft seal packing and the shaft seal chamber is heightened.

The invention relates to the valve shaft structure for a valve, wherein resistance of friction between the gland washer and the shaft seal packing to for an integral body, thereby preventing the shaft seal packing from being rotated following rotation of the valve shaft.

The invention relates to the valve shaft structure for a valve, wherein the gland washer is provided on an outer periphery thereof with cutout parts disposed at appropriate intervals and, via the cutout parts, the gland washer and shaft seal packing are formed into an integral body, thereby preventing the shaft seal packing from being rotated following rotation of the valve shaft.

According to the invention, since the surface contact is obtained on the inner-diameter side of the packing at the time of initial assembly, the deformation is small and there is small room to vary the volume of the packing, stress relaxation is lowered to enable provision of the shaft seal packing capable of securing excellent sealability through an increased seal surface pressure by pressing and through self-sealability by fluid pressure.

According to the invention, the shaft seal packing can secure the gaps between the adjacent packing bodies stacked when performing retightening and restore the sealability. Since the packing bodies can easily be formed with high accuracy, even when the size of the packing bodies, such as the diameter, varies, the shaft seal packing can enhance the seal surface pressure and fulfill the self-sealability.

According to the invention, it is possible to configure the shaft seal packing capable of infallibly forming the gaps between the adjacent packing bodies with ease when stacking the packing bodies. Furthermore, variation in deviation amount enables the amount of the gaps to be adjusted in both the axial and diametrical directions, thus enabling setting the volume of the packing or lip part in consideration of the tightening force by the bolt and nut and fluid pressure.

According to the invention, the shaft seal packing can most heighten the sealability at the time of attachment or retightening and, even when the tightening force by the bolt and nut is small, can maintain the high sealability by means of the packing bodies.

According to the invention, the shaft seal packing can be stored at a prescribed position corresponding to the shaft seal section of any height, used for various shaft seal sections including a valve, and heighten the sealability by pressing and self-sealability while exhibiting slidability at the operation thereof.

According to the invention, it is possible to provide the shaft seal structure for a valve that can be used for valves of various structures, exhibits small stress relaxation by the initial tightening force, can infallibly heighten and retain the sealability even at the time of retightening, and can enhance the seal surface pressure by pressing and retain or restore the self-sealability by the fluid pressure to continue excellent sealability.

According to the invention, it is possible to provide the valve seal structure for a valve excellent in operability, high in strength capable of exhibiting high sealability and enhancing dynamic sealability while securing excellent slidability when the surface contact seal has been obtained on the inner-diameter side and when the stem that is the sliding part has been rotated. On the other hand, the shaft seal structure for a valve can subject the body that is the fixed sealing side and the packing bodies to shaft seal by the highest seal surface pressure through the line contact seal on the outer-diameter side and exhibits excellent sealing performance to enhance static sealability.

According to the invention, the shaft seal structure for a valve has a ball valve excellent in operability attached thereto because repeated retightening enables the sealability on the stem side and body side to be heightened infallibly even when the shaft seal part has been worn away or deformed and further because the sealability can be retained and restored with a small tightening force.

According to the invention, the shaft seal structure for a valve can maintain a state having the surface pressure on the outer-diameter side of the shaft seal packing particularly increased even when valve temperature variation has been induced, prevent the shaft seal packing from being rotated following the rotation of the valve shaft attached to the inner-diameter side, maintain static sealability of the shaft seal packing and shaft seal chamber while securing high dynamic sealability by the valve shaft and shaft seal packing and thus exhibit excellent shaft seal performance.

According to the invention, the shaft seal structure for a valve prevents the shaft seal packing from being rotated following the rotation of the valve shaft to exhibit excellent shaft seal performance because the gland washer and shaft seal packing are made substantially integral even when valve temperature variation has been induced, thereby enabling the shaft seal packing to be fixed to the shaft seal chamber.

DETAILED DESCRIPTION OF THE INVENTION

Figure 1:
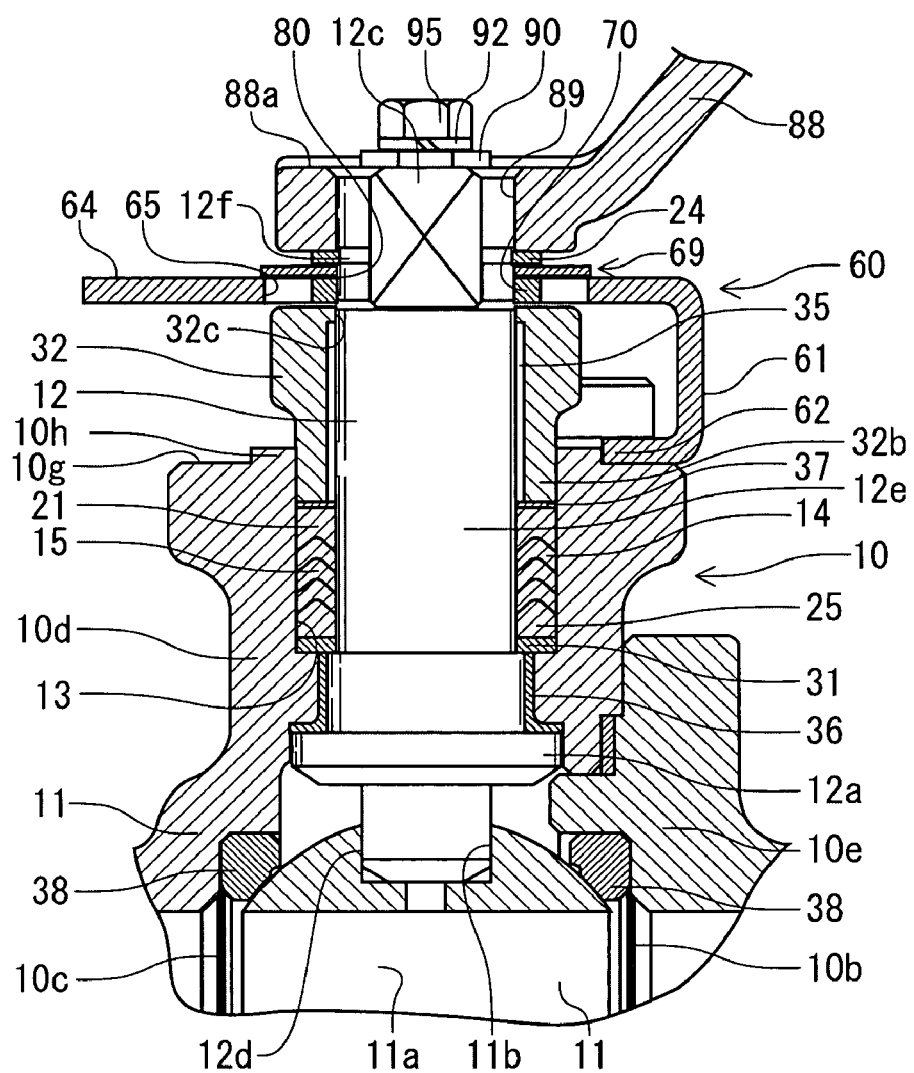
FIG. 1 is a partially cutaway cross section showing one example of a valve using a shaft seal packing according to the present invention.
Figure 2:
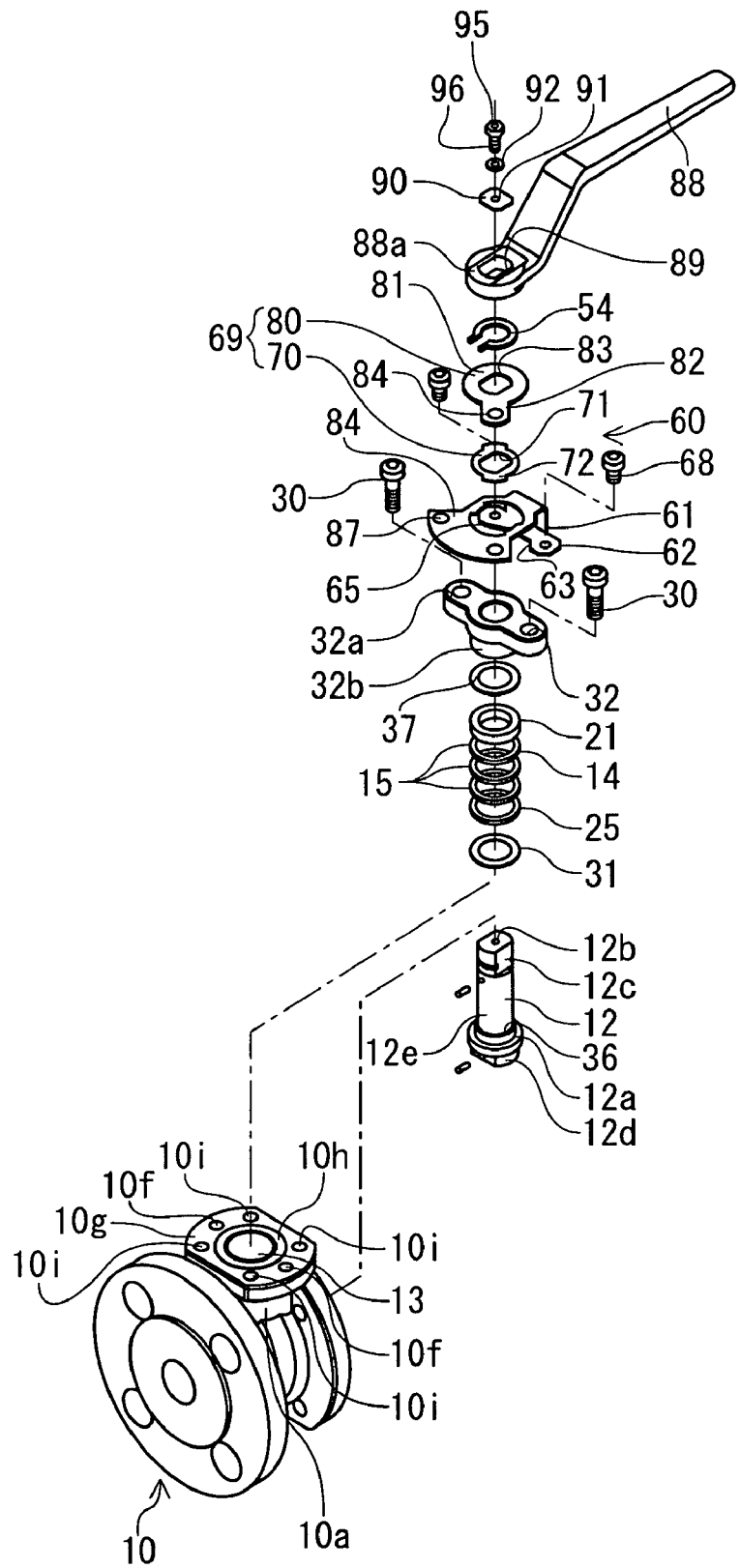
FIG. 2 is an exploded perspective view showing the valve shown in FIG. 1.

Embodiments of a shaft seal packing and a shaft seal structure for a valve according to the present invention will be described hereinafter in detail with reference to the drawings. In FIGS. 1 and 2, a valve body 10 comprises, for example, a ball valve provided with a ball valve disc 11 rotatable via a valve shaft (stem) 12 that is an operation transmission member. The valve body 10 has a body 10a that is provided on the opposite sides thereof with an inflow port 10b and an outflow port 10c that are open inflow and outflow parts for a fluid and on the upper side thereof with an extending shaft mounting part 10d. The shaft mounting part is provided therein with a shaft seal chamber 13.

The valve shaft 12 is formed at the position in the vicinity of the lower end thereof integrally with a flange 12a, on the upper end thereof with a screw part 12b with which a fixing bolt 95 is helically engaged, on the upper portion thereof with two chamfered parallel faces 12c and on the lower portion thereof with two similar parallel faces 12d.

The ball valve disc 11 has a through hole 11a and is provided on the upper portion thereof with a fitting groove 11b in which the two parallel faces 12d of the valve shaft 12 are fitted. The ball valve disc 11 has the two parallel faces 12d fitted in the fitting groove 11b and is rotatably installed in the body 10a in a state in which it is clamped between two seat rings 38 while maintaining sealability by means of the seat rings 38. Since the seat ring 38 is made of a material exhibiting high airtightness or high water-tightness, such as PTFE, sealing characteristics are well secured.

A body cap 10e is attachably provided by means of a tightening bolt and nut not shown on the open side of the body 10a (on the side of the inflow port 10b in the present embodiment) and is integrally installed after the ball valve disc 11, valve shaft 12 and shaft seal packing 14 are mounted on the prescribed places in the body 10a to enable the assemblage of the seat rings 38 relative to the ball valve disc 11 in a pressure-sealed state.

The shaft seal packing 14 comprises a top adapter 21, a bottom adapter 25 and a plurality of stacked annular packing bodies 15 made of a resin, such as PTFE, and sandwiched between the top and bottom adapters. The packing bodies 15 are attached to the shaft seal chamber 13 in the body 10a and the number thereof can be set in compliance with the mode of the valve body 10 and in accordance with the diameter of the valve shaft 12 and the pressure required for sealing. The packing bodies 15 are stored to meet the width of the shaft seal chamber 13 to constitute the shaft seal packing 14.

Figure 8:
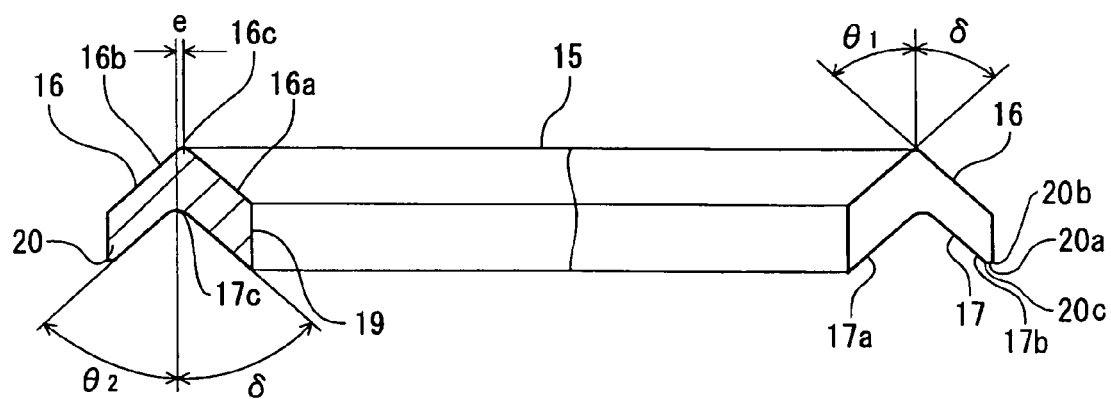
FIG. 8 is a cross section showing a shaft seal packing according to one embodiment of the present invention.

As shown in FIG. 8, the packing body 15 is annularly formed in a substantially V-shape and has an upper mountain-shaped stacked layer face 16 and a lower valley-shaped stacked layer face 17. In the packing body 15, an apex 17c of the valley-side lower stacked layer face 17 is deviated by an eccentric amount e in the outer diameter direction from an apex 16c of the mountain-side upper stacked layer face 16 to make the apexes 16c and 17c eccentric relative to each other.

In addition, since the packing body 15 is annularly formed in substantially the V-shape in cross section, the upper and lower stacked layer faces 16 and 17 has inner-diameter side stacked layer faces 16a and 17a and outer-diameter side stacked layer faces 16b and 17b, respectively. The inner-diameter side stacked layer faces 16a and 17a have an equal inclined angle $\delta$ that is set to be 48° in the present embodiment. The inclined angle $\delta$ can re retained at a constant angle (48°) irrespective of the presence or absence of a tightening force from a bolt 30 or the degree of a tightening load.

On the other hand, the outer-diameter side stacked layer faces 16b and 17b and have different taper angles. To be specific, a mountain-side angle $\theta_1$ that is a taper angle of the outer-diameter side upper stacked layer face 16 is in the range of 42.5° to 50°, and a valley-side angle $\theta_2$ that is a taper angle of the outer-diameter side lower stacked layer face 17 is in the range of 40° to 47.5° that is a taper angle of the outer-diameter side upper stacked layer face 16 is in the range of 42.5° to 50° to satisfy the mountain-side angle $\theta_1$>the valley-side angle $\theta_2$. In the present embodiment, the mountain-side angle $\theta_1$ and valley-side angle $\theta_2$ are set to be 48° and 39°, respectively.

Figure 3:
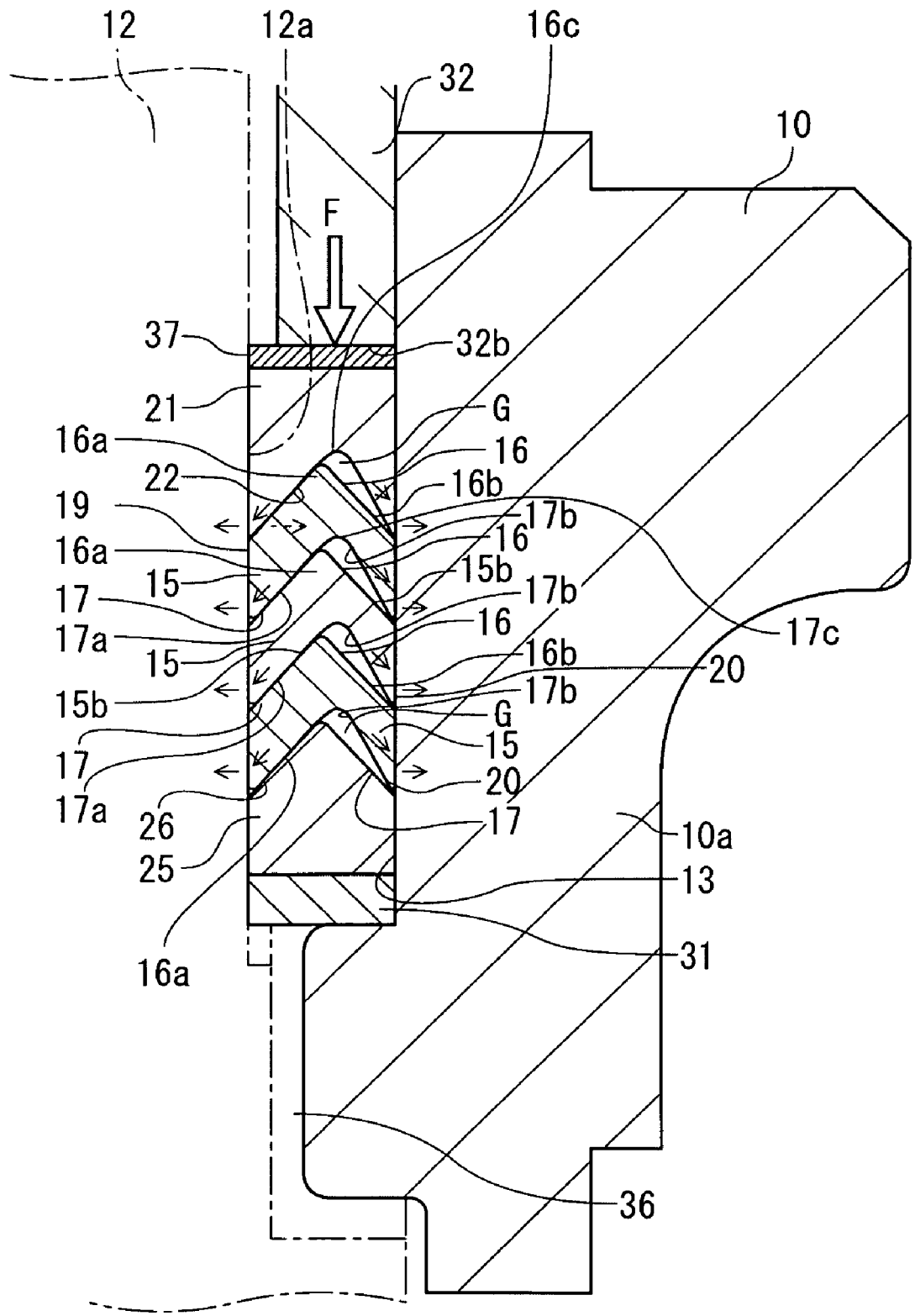
FIG. 3 is an explanatory view of the principle, showing a state assumed at an initial time of pressing in the valve of FIG. 1.

By forming the packing body 15 as described above, when the packing body has been attached to the shaft seal chamber 13, it is possible, as shown in FIG. 3, to bring the outer-diameter side stacked layer faces 16a and 17a into tight contact with each other and to form a prescribed gap G between the outer-diameter side stacked layer faces 16a and 17b. The gap G can appropriately be adjusted in width through adjustment of the mountain-side and valley-side angles $\theta_1$ and $\theta_2$ or the eccentric amount e between the apexes 16c and 17c. When the eccentric amount e is made large while the difference between the mountain-side and valley-side angles $\theta_1$ and $\theta_2$ is made large, the gap G becomes wide and, in the reverse case, the gap G becomes narrow.

In addition, the packing body 15 has an asymmetric structure in which the mountain-side and valley-side angles $\theta_1$ and $\theta_2$ are made variable within the width range of the gap G while retaining the inner-diameter side inclined angles $\delta$ constant at the upper and lower stacked layer faces 16 and 17, respectively. By disposing the apexes 16c and 17c of the mountain-side upper stacked layer face 16 and valley-side lower stacked layer face 17 eccentrically while retaining the inclined angles $\delta$ constant, the gap G is secured in the axial and diametrical directions.

Furthermore, since the packing body 15 has an eccentric shape as described above, the outer-diameter side is slightly thinner than the inner-diameter side and, therefore, the fluid pressure readily enables the diameter to be increased. Though the lower outer-diameter side stacked layer face 17b of the packing body 15 may be formed in a round shape as described later, in the present embodiment, this section is tapered from the standpoint of securing rigidity of the section and enabling attainment of strong pressure toward the shaft seal chamber 13 of the valve body 10. In addition, the aforementioned adjustment of the eccentric amount e enables the adjustment of the width of the gap G and setting of the volume of the packing body 15 (a lip part 20 as described later) in view of the sealability by the tightening force of the gland bolt 30 or the fluid pressure.

Figure 7:
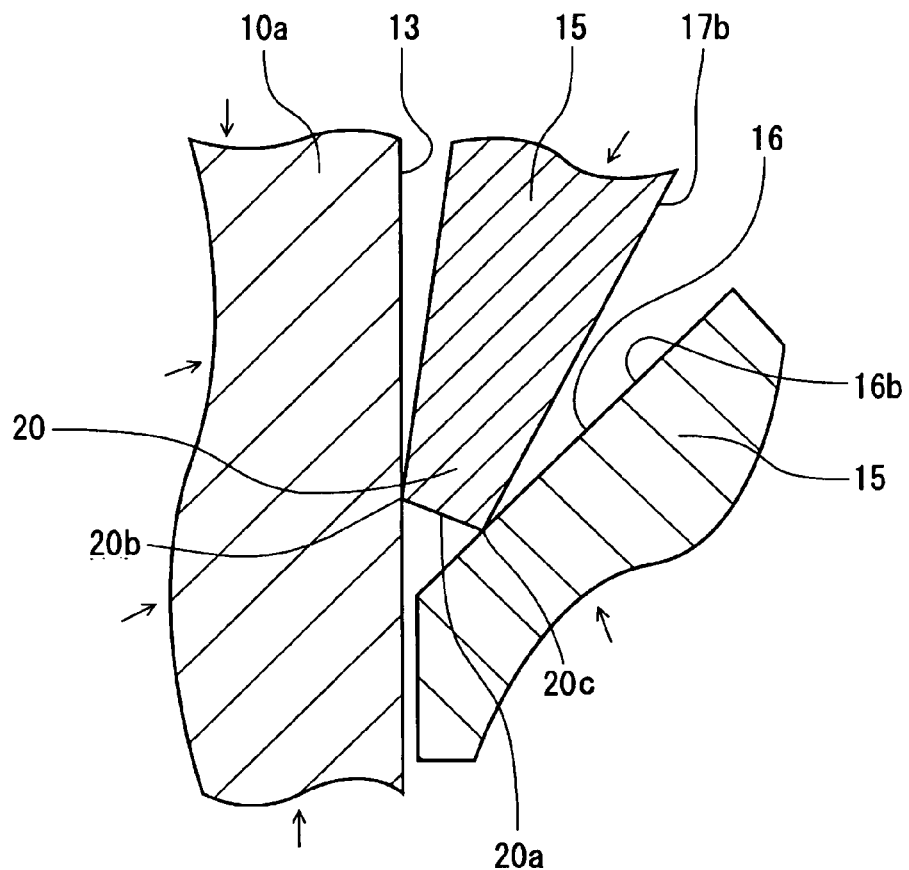
FIG. 7 is an enlarged view of a principal portion sealed with the shaft seal packing.

The packing body 15 has on the inner-diameter side thereof an inner peripheral surface 19 that can come into surface contact with an outer peripheral surface 12e of the valve shaft 12. On the other hand, the packing body 15 has on the outer-diameter side thereof the lip part 20 that can come into line contact with the shaft seal chamber 13. As shown in FIG. 7, the lip part 20 has a chamfered part 20a to form an outside contact part 20b and an inside contact part 20c, thereby slightly acquiring its rigidity and infallibly attaining line contact at the outside and inside contact parts 20b and 20c.

In FIG. 3, the top adapter 21 has on the valley side a lower stacked layer face 22 that has on the inner-diameter and outer-diameter sides the same angles as the lower stacked layer face 17 of the packing body 15. The top adapter 21 has on the upper face side thereof a flat face onto which a gland washer 37 is attached. On the other hand, the bottom adapter 25 has on the mountain side an upper stacked layer face 26 that has on the inner-diameter and outer-diameter sides the same angles as the upper stacked layer face 16 of the packing body 15. The bottom adapter 25 has on the lower face side thereof a flat face on which a washer 31 is disposed.

When the shaft seal packing 14 is attached to the shaft seal chamber 13, the tightening load on the packing body 15 and fluid pressure are converted to a force in the diametrical direction owing to the inclined angles δ of the upper and lower stacked layer faces 16a and 17a on the inner-diameter side to attain a seal by a surface contact between the inner peripheral surface 19 on the inner-diameter side and the outer peripheral surface 12e of the valve shaft 12 on the sliding side, and the fluid pressure guided into the gap G enables the lip part 20 on the outer-diameter side to be pushed and spread to attain a seal by a line contact with the shaft seal chamber 13 on the fixed side. At this time, the inclined angles δ on the inner-diameter side are not necessarily the same angle and may be the angles capable of attaining a tight contact on the inner-diameter side.

The shaft seal packing 14 is provided on the upper side thereof with a gland member 32 having a bolt insertion hole 32a, and the body 10a is provided with an internal thread 10f at a position corresponding to the position of the bolt through hole. The gland bolt 30 that is the fixing member is screwed into the bolt insertion hole and internal thread to tighten the gland member. When the gland member 32 has been tightened, the shaft seal packing 14 can be pressed from upward by means of a pressing part 32b formed on the lower side of the gland member 32. Thus, the shaft seal packing 14 can be tightened and retightened. A disc spring not shown intervenes between the gland bolt 30 and the gland member 32 to give an axial-direction force to the shaft seal packing 14, thus serving to assist enhancing the sealability.

The valve shaft 12 is provided on upper and lower pivotal support sections thereof with a gland bush 35 for a bearing and a stem bearing 36 that intervene respectively between the gland member 32 and the body 10a of the valve body 10 to pivotally support the valve shaft 12. The gland bush 35 and stem bearing 36 may be formed of a fluorine resin having a filling material not shown mixed therein. In this case, the valve shaft 12 can smoothly rotate and endure repeated rotation operations.

The gland washer 37 is attached between the gland member 32 and the top adapter 21 to assist pivotal support of the valve shaft 12 and covers the upper side of the top adapter 21 to uniformly give the axial-direction force from the gland member 32 to the upper side of the top adapter 21, thereby assisting the sealing operation of the shaft seal packing 14.

A tightening load is given via the gland washer 37 to the shaft seal packing 14 to attach the shaft seal packing. In FIG. 9(a), the gland washer 37 may be a conical disc spring washer, for example, that is provided as disposed on the upper side of the shaft seal packing 14. In addition, FIG. 9(b) shows a state in which the washer 37 is deformed into a flat shape through tightening of the gland member 32. By bringing the non-compressed state of FIG. 9(a) to the compressed state of FIG. 9(b), the gland washer 37 generates a spring force and, by means of the restoring force, the outer-diameter side of the shaft seal packing 14 is always pressed to heighten the surface pressure between the shaft seal packing 14 and the shaft seal chamber 13.

The gland washer may be crimped as shown in FIGS. 10(a) and 10(b) to form a crimped gland washer 37'. When the crimped gland washer has been attached to the shaft seal packing 14 to form an integral body, with the surface pressure heightened locally and the frictional resistance enlarged, thereby preventing the shaft seal packing 14 from being rotated following the rotation of the valve shaft 12.

In this case, in the case where no slippage is caused between the gland washer 37' and the top adapter 21 when the gland member 32 has been tightened as shown in FIG. 10(c), slippage between the top adapter 21 and the packing body 15 and between the packing body 15 and the bottom adapter 25 can be prevented. This is because a force to spread the packing bodies 15 relative to one another in the diametrical direction by means of the tightening force and because both the areas of contact of the packing bodies 15 and the frictional force become large at that time. In addition, since both the gland washer 37' and the gland member 32 are metal parts, the frictional resistance becomes large to prevent sliding.

Furthermore, though not shown, the gland washer is provided on the lower side thereof with convexo-concave parts, for example, to enlarge the frictional resistance relative to the shaft seal packing 14. Otherwise, the accuracy of the coarseness of the finished surface of the shaft seal chamber 13 is degraded to an extent not to lower the sealability relative to the shaft seal packing 14 to enlarge the frictional resistance between the outer periphery of the shaft seal packing 14 and the shaft seal chamber 13. Furthermore, a metal adapter not shown and a shaft seal packing made of resin or rubber are used in combination to enable the frictional resistance to be enlarged. In this case, when constituting an adapter made of metal (or highly rigid resin), it is possible to enhance the rigidity of the packing portion and heighten the functionality required for supporting the valve shaft with a bearing.

In FIG. 11(a), a gland washer 37" is formed on the outer periphery thereof at appropriate intervals with cutout parts 39 to form parts not in contact with part of the shaft seal packing 14 when the gland washer 37" and shaft seal packing 14 are overlapped via the cutout parts 39 as shown in FIG. 11(b). As a result, the parts not in contact with the shaft seal packing 14 becomes bulging parts 14a when tightening has been performed to allow the bulging parts to bulge out toward the side of the gland washer 37" and cover the outer periphery of the gland washer 37" as shown in FIG. 11(c). Thus, the gland washer 37" and shaft seal packing 14 are integrated to prevent the shaft seal packing 14 from being rotated following the rotation of the valve shaft 12.

Incidentally, as shown in FIG. 1, the gland member 32 has on the upper side of the inner periphery thereof a diameter-reduced part 32c that rotatably supports the valve shaft 12 in conjunction with the three members, i.e. the gland washer 37, washer 31 and stem bearing 36, to suppress scale deflection of the valve shaft 12 and further enhance the sealability by the shaft seal packing 14. The diameter-reduced part 32c may be formed on the lower side of the inner periphery of the gland member 32 and, in this case, the upper-side gland washer 37 can be omitted.

As described above, the present embodiment shows the example in which the shaft seal packing 14 is attached to the ball valve. However, the valve body is not limited to the ball valve insofar as a valve disc formed in a body can rotate or ascend and descend via a valve shaft. That is to say, the shaft seal packing can be attached similarly to various kinds of valves. In the shaft seal structure for a valve according to the present invention, the shaft seal packing 14 is attached to the valve seal chamber 13 having the valve shaft 12 attached thereto and has the packing bodies 15 stacked one on top of another, in which the inner-diameter side stacked layer faces 16a and 17a are brought into tight contact with each other and the prescribed gap G is formed between the outer-diameter side stacked layer faces 16b and 17b. When the tightening load has been exerted with the gland bolt 30, the sealability on the inner-diameter side is heightened along the stacked layer faces 16a and 17a while tightening load is supported, and the initial sealability on the outer-diameter side can be obtained through the tightening. Furthermore, in the meantime, the fluid pressure is guided to the gap G to attain a seal. Since the shaft seal packing 14 including the packing bodies 15 has the asymmetrical structure on the inner-diameter and outer-diameter sides thereof, the sealing characteristics on the inner-diameter and outer-diameter sides is made different from each other to enable fulfillment of the sealing functions peculiar to the respective sections.

Figure 18:
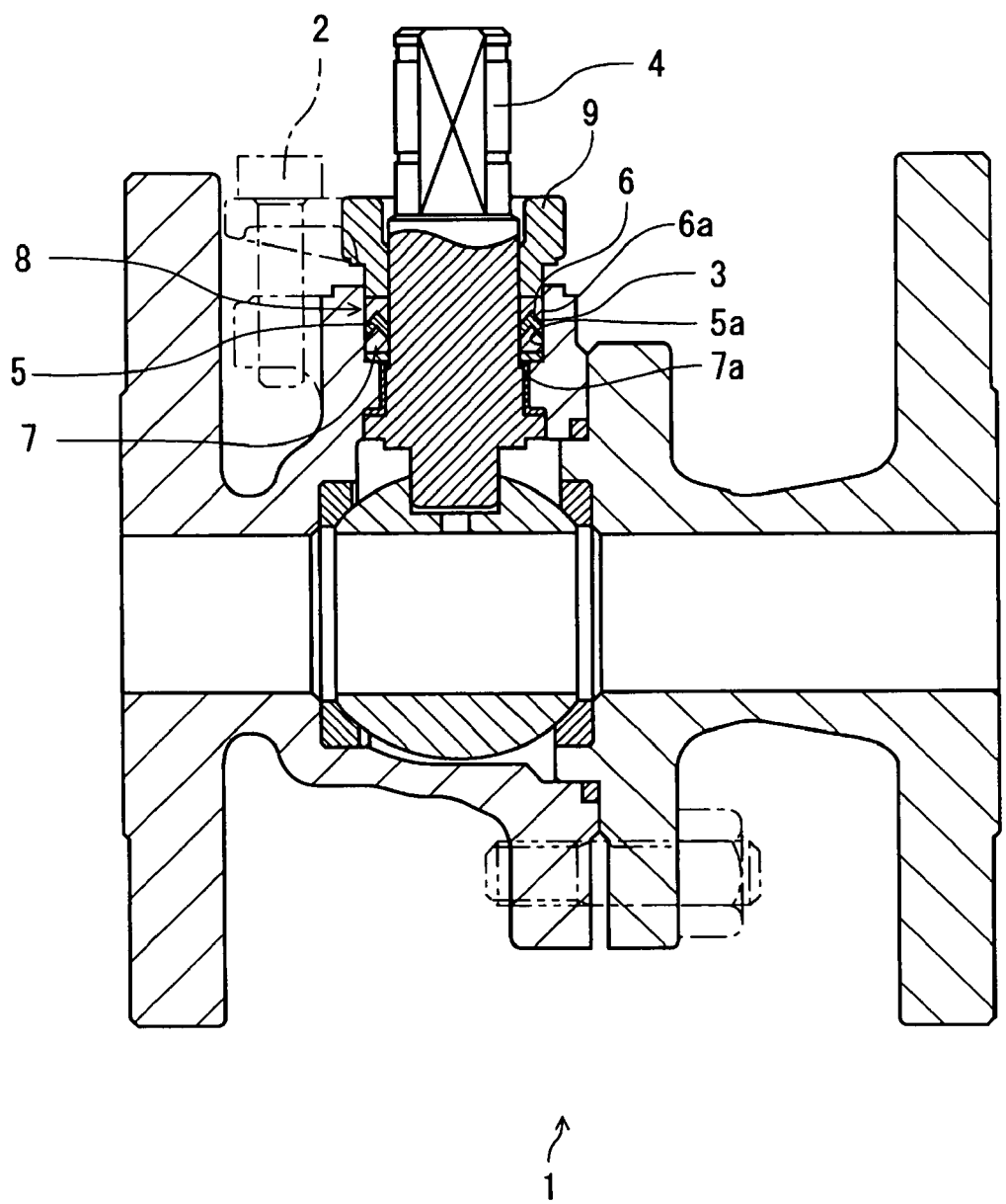
FIG. 18 is a partially cutaway cross section showing an example of a valve using a conventional V-packing.
Figure 19:
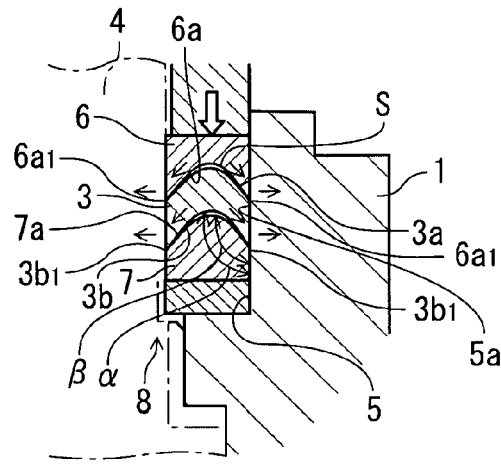
FIG. 19 includes explanatory views of the principle, showing the shaft seal structure of the valve shown in FIG. 18, (a) being an explanatory view of the principle, showing a state assumed at an initial time of pressing, (b) being an explanatory view of the principle, showing an state assumed at a time of pressing by retightening and (c) being an explanatory view of the principle, showing a state assumed when receiving fluid pressure.
Figure 19:
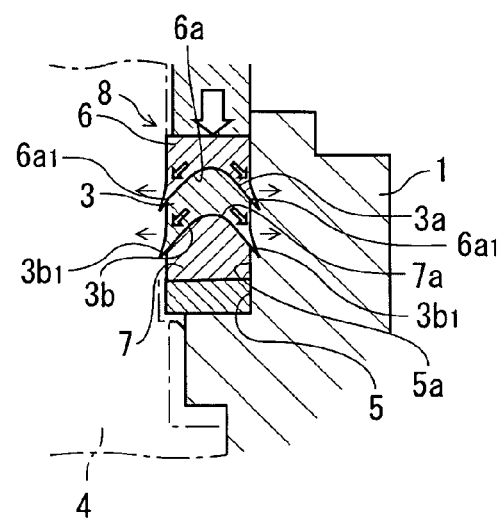
Figure 19:
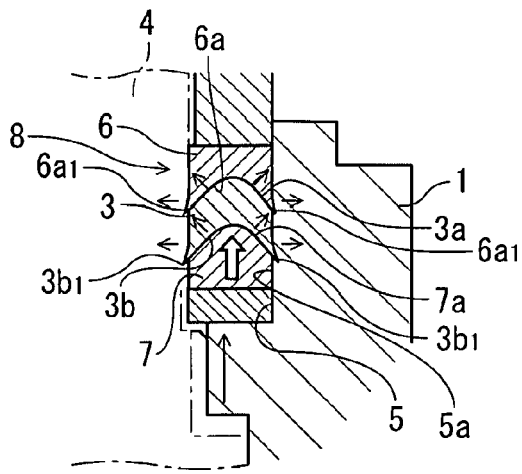

Furthermore, the valve body 10 is provided with a stopper mechanism 60 in which the valve shaft 12 is provided with a stopper section for indicating and regulating the opening and closing positions, the valve body is equipped with a locking section for determining the position of the valve shaft 12 and, when the valve shaft 12 has been rotated, the stopper section is brought into contact with the locking section to enable determination of the fully open and fully closed positions of the valve. When the valve body has this mechanism, similarly to the ball valves described in Patent Document 1 and shown in FIG. 18, it goes without saying that the packing can be tightened and retightened by the use of the gland bolt and, like the valves described in Patent Document 1 and shown in FIG. 18, when the valve has been subjected to the opening/closing operation, a force in the direction of swinging over to the bolt for retightening is exerted to prevent the gland bolt from being loosened. That is to say, the valve body 10 of the present embodiment can manually be operated without adversely affecting the sealability of the shaft seal packing 14 and has a structure that can manually be operated while maintaining high sealability of the shaft seal packing 14. In addition, since the stopper mechanism 60 is easy to assemble and excellent in workability, the ball valve can exhibit high safety and be fabricated at low cost. The stopper mechanism 60 will be described in detail hereinafter.

Figure 12:
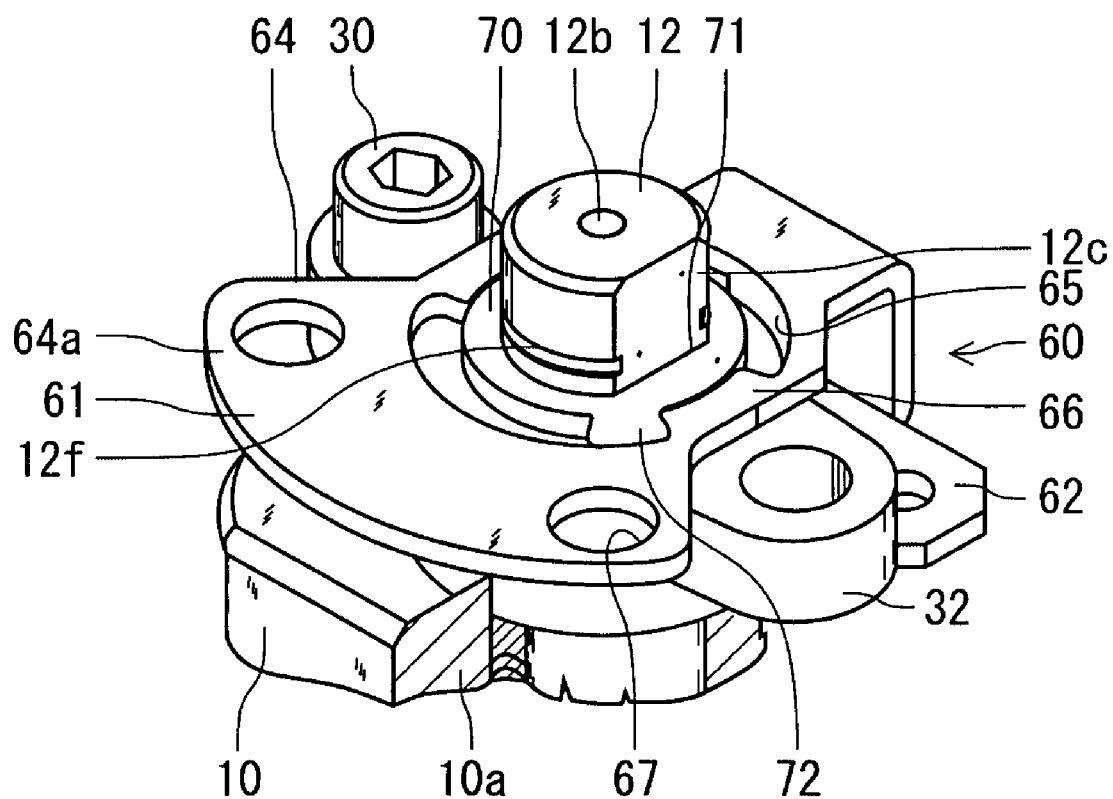
FIG. 12 is a partially enlarged perspective view of a ball valve.
Figure 13:
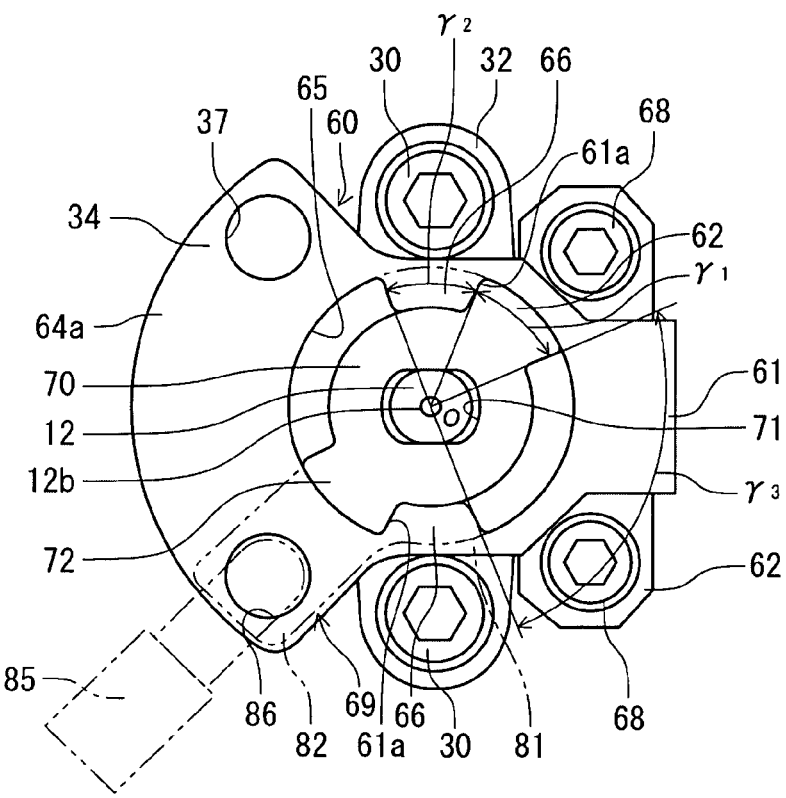
FIG. 13 includes plan views showing the neighborhood of a stopper mechanism.
Figure 13:
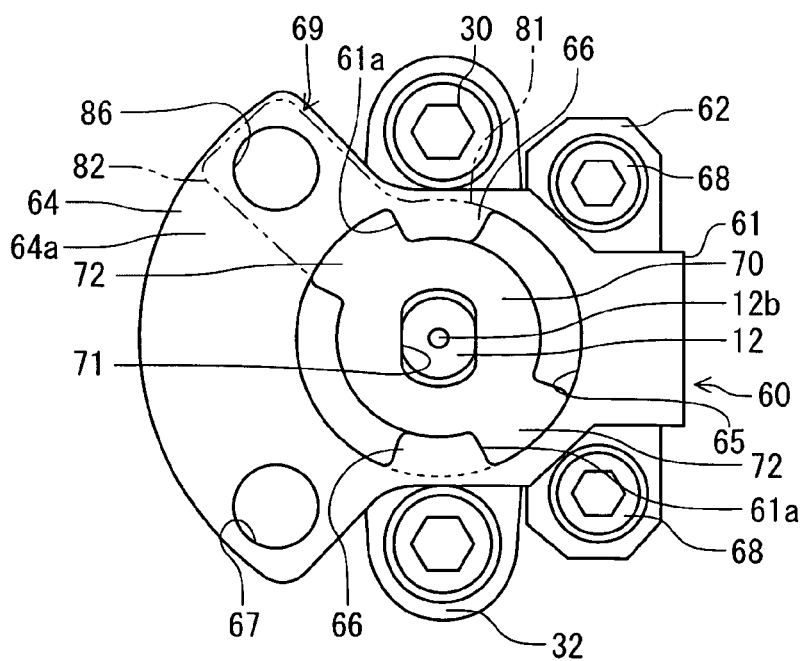

In the stopper mechanism 60 shown in FIGS. 1, 12 and 13, a fixing member 61 is a stopper plate provided so that it may be fixed onto a mounting part 10g on the upper side of the body 10a. The stopper plate 61 has at a lower position thereof a bent fixing part 62 capable of being fixed onto the upper side of the body 10a. The fixing part 62 is formed with a substantially circular-arc-shaped bottom part 63 that can engage with the outer peripheral side of a convex part 10h of the body 10a. Thus, the stopper plate 61 is formed in a substantially J-shape in cross section as shown in FIG. 1, and a locking plate part 64 is engageably provided on the upper side of the gland member 32.

The locking plate part 64 is provided substantially in the vicinity of the center thereof with an opening 65 that has two engaging parts 66 and 66 directed toward the center at an angle of 180°. An angle $\gamma_1$ of projection of the engaging part 66 is 45° from a center O. In addition, a fan-shaped part 64a at the end of the locking plate part 64 is provided with two bores 87 and 87 that are formed at an angle of 90° that is the angle of rotation of the ball valve disc 11 of the valve body 10, thereby allowing a bore 84 of a key lock plate 80 to be described later to be able to communicate with the bore 87.

The stopper plate 61 is mounted on the mounting part 10g of the body 10a in the state in which it is positioned with the convex part 10h, and fixed by means of two fixing members (stopper bolts) 68 and 68 inserted into bolt holes 10i formed in the mounting part 10g for the attachment of an actuator as shown in FIG. 2, thereby fixing the stopper plate in the vicinity of the shaft mounting part 10d of the body 10a and disposing the valve shaft 12 at the center position of the opening 65. Consequently, the stopper plate 61 that is a part for positioning the opening/closing position of the ball valve disc 11 can be attached in an easily and infallibly positioned state without subjecting the shaft mounting part 10d to any processing and, by providing the stopper plate separately from the shaft mounting part, an adverse effect on the shaft seal packing 14 is prevented.

A rotation member 69 is plate-shaped and has both a key lock member (key lock plate) 80 and a plate-shaped movable locking member (stopper) 70 provided on one surface of the key lock plate 80 fixed the valve shaft 12. As a result, when the valve shaft 12 has been rotated, an operation of stopping valve opening/closing and an operation for enabling a key lock are made at a time.

The key lock plate 80 has an annular part 81 and a projecting piece 82 extending from the annular part 81, as shown in FIGS. 2 and 13. The annular part 81 has a larger diameter than the opening 65 and, as shown in FIG. 1, when it has been attached onto the stopper plate 61, it can stop up the opening 65. The annular part 81 is provided at substantially the center position thereof with a fitting hole 83 in which the two parallel faces 12c can be fitted. In addition, the projecting piece 82 is formed on the distal end side thereof with a bore 84 having substantially the same diameter as the bores 87 of the stopper plate 61.

The key lock plate 80 is slidably attached in a state in which the projecting piece 82 is brought into surface contact with one surface of the stopper plate 61 and, when the key lock plate 80 (valve shaft 12) has been rotated relative to the stopper plate 61, the bore 84 is in alignment with one of bores 87 of the stopper plate 61 for the opening/closing position. It has a locking hole 86 for use in locking with a locking tool 85, such as a padlock, as shown in FIG. 13(a). By locking the locking hole 86 with the locking tool 85, the valve open/closed state can be maintained.

On the other hand, the stopper 70 is provided with a hole 71 in which the two parallel faces 12c can be fitted and with two radial locking parts 72 that project at an angle of 180° as shown in FIG. 13 and are in contact with the engaging parts 66 of the stopper plate 61 at two places to enable the stopper to rotate within the opening 65 in a rotation-regulated state.

An angle $\gamma_2$ of projection of the locking parts 72 is, as shown in FIG. 13, 45° from the center O and, when the stopper 70 has been rotated, the locking parts 72 are brought into contact with the engaging parts 66. As a result, an angle $\gamma_3$ of rotation becomes 0 to 90° relative to the stopper plate 61. Therefore, the valve shaft 12 can rotate at an angle of rotation in the range of 0 to 90°.

The rotation member 69 is fixed as mounted on the gland member 32 on the upper end of the valve shaft 12 while fitting the two parallel faces 12c of the valve shaft 12 in the fitting hole 83 and hole 71 so that corotation (rotations made together) of the valve shaft 12 may be attained (incidentally, the word "corotation" in this case relates to the rotations of the valve shaft 12 and stopper 70). Consequently, the locking parts 72 of the rotation member 69 are positioned within the opening 65 and, at the same time, the engaging parts 66 and locking parts 72 can be stopped within the opening 65. The rotation member 69 after being attached cannot rotate relative to the valve shaft 12 similarly to the stopper 70 and, in this state, by fitting a fixing member (C-shaped retaining ring) 24 in an annular groove 12f formed in the valve shaft 12, detachment thereof can be prevented in a state in which the stopper 70 and key lock plate 80 have been positioned in the vertical direction.

Thus, the rotation member 69 on the movable side is rotatably attached to the stopper plate 61 on the fixed side in a state of peripheral surface contact, and the stopping part 72 is internally enfolded in the stopper plate 61 to prevent its exposure to the outside. In addition, the rotation member 69 is internally enfolded in the stopper plate 61 to enable storage of the height of the stopper mechanism 60 comprising the stopper plate 61 and stopper 70 within the small thickness of the stopper plate 61, thus miniaturizing the stopper mechanism 60 as a whole.

Furthermore, the rotation member is made integral to obtain a simple configuration, reduce the number of parts, facilitate assemblage and reduce the cost of fabrication. Moreover, the rotation member and key lock plate 50 are formed of a plate material by press working to further reduce the cost of fabrication. In the present embodiment, the rotation member has the key lock plate and stopper formed separately from each other. However, it may be formed of a plate (not shown) having a key lock plate provided integrally with a stopping part, and the plate may be fixed to the valve shaft 12 so that the stopping part may be engaged in the opening of the stopper plate 61.

An operating member (lever handle) 88 is attached to the upper side of the valve shaft 12 as shown in FIGS. 1 and 2, and manual operation of the lever handle 88 enables opening/closing of the ball valve disc 11. The lever handle 88 is of a generally used type and is not limited to its overall shape insofar as it has an attaching hole 89 in which the two parallel faces 12c of the valve shaft 12 can be fitted.

A handle lock member (handle lock plate) 90 is formed in a plate shape as shown in FIGS. 1 and 2 and is provided at the center thereof with a bore 91 having a caliber in which an external thread of a fixing bolt 95, such as a hexagonal bolt, can be inserted and is made rotatable relative to the fixing bolt 95 when the fixing bolt has been loosened.

Next, the procedure of assembling the ball valve having the aforementioned configuration will be described. In FIGS. 1 and 2, the ball valve disc 11 and seat ring 38 are attached to the inside of the body 10a, the valve shaft 12 having the stem bearing 36 attached thereto is attached to the inside of the shaft mounting part 10d from the side of the inflow port 10b, and a tightening bolt and nut not shown is used for tightening to make the body 10a and body cap 10e integral with each other. Subsequently, the shaft seal packing 14 is attached to the valve shaft 12 while being clamped between the gland washer 37 and the washer 31, and the gland member 32 having the gland bush 35 attached thereto is attached from above and tightened with the gland bolt 30 as shown in FIG. 12 to fix the gland member 32 while being sealed with the shaft seal packing 14.

Subsequently, as shown in FIG. 2, the stopper plate 61 is fixed to the body 10a by means of the stopper bolt 68. At this time, by attaching the circular-arc-shaped bottom part 63 to the circular convex part 10h in combination, the stopper plate 61 is fixed in a state positioned infallibly. The stopper plate 61 is fixed utilizing the bolt holes 10i for the attachment of the actuator. Thus, the stopper plate 61 is fixed by means of the stopper bolt 68, with its center adjusted relative to the shaft mounting part 10d of the body 10a by means of the convex part 10h.

Next, the stopper 70 is attached to the valve shaft 12. The stopper 70 is attached with the two parallel faces 12c of the valve shaft 12 fitted in the hole 71 and, as a result, the stopper 70 is positioned relative to the valve shaft 12 and can be rotated together with the valve shaft 12 when the valve shaft 12 is rotated. The stopper 70 is fixed at a position on the bottom side of the two parallel faces 12c.

Furthermore, the key lock plate 80 is attached onto the stopper 70. Since the key lock plate 80 has the fitting hole 83 similarly to the stopper 70, it is nonrotatably attached to the valve shaft 12, with the two parallel faces 12c fitted in the fitting hole 83, and becomes rotatable together with the valve shaft 12. By attaching the key lock plate 80, the stopper 70 is brought to a state enfolded in the key lock plate 80 and stopper plate 61. In this state, the C-shaped retaining ring 24 is attached to the annular groove 12f of the valve shaft 12. The C-shaped retaining ring 24 can infallibly suppress the stopper 70 and key lock late 80 from falling off.

Next, the lever handle 88 is attached onto the upper side of the valve shaft 12, with the fitting hole 89 oriented to the two parallel faces 12c, and the handle lock plate 90 is attached to an attaching part 88a of the lever handle 88. Thus, the valve body 10 is formed integrally.

Subsequently, the operation of opening/closing the valve body 10 will be described. In FIG. 13, (a) shows the state of the valve fully open and (b) the state of the valve fully closed. As an example of the operation of opening/closing of the valve, the case of operating the valve from the fully open state to the fully closed state will be described. When the lever handle 88 is manually rotated to rotate the ball valve disc 11 from the fully open state to the fully closed state, since the two parallel faces 12c are fitted in the attaching hole 89, the valve shaft 12 is also rotated. At this time, the stopper 70 and key lock plate 80 fitted on the two parallel faces 12c are also rotated within the opening 65 of the stopper plate 61 following the rotation of the valve shaft 12.

When the locking parts 72 are brought into contact with the engaging parts 66, as shown in FIG. 13(b), the stopper 70 cannot be rotated any more to stop the rotation of the valve shaft 12. Thus, since the positions of the locking parts 72 and engaging parts 66 are determined so that the angle of rotation from the state of FIG. 13(a) to the state of FIG. 13(b) may be 90°, the stopper 70 infallibly produces the valve-open or valve-closed state at the time of the above contact.

Furthermore, since the locking parts 72 are in contact with the engaging parts 66 at the two places to attain the lock, the valve shaft 12 can be stopped with exactitude. Moreover, since the locking parts 72 are locked with the engaging parts 66 provided at the angle of 180°, they can be locked at point-symmetrical positions with the rotation axis of the valve shaft 12 as the center, thus preventing application of an unbalanced load to the rotation axis at the time of the lock and enhancing the strength.

The function of the operation of rotating the valve is quite the same as in the case of the rotation from the state of FIG. 13(b) to the state of FIG. 13(a) and, since the locking parts 72 are thus locked at the engaging parts 66 to perform the valve-opening or valve-closing operation, an operator can operate the valve unintentionally until the open or closed state only by rotating the lever handle 88 until the lever handle 88 is stopped and, moreover, the lever handle can be stopped in the accurately open and closed states.

At this time, since the key lock plate 80 is rotated at the same rotation angle as the stopper 70, the bore 84 formed in the projecting piece 82 of the key lock plate 80 can be in alignment with one of the bores 87 of the stopper plate 61 in the valve-open or valve-closed state. By passing the locking tool 85 through the locking hole 86 comprising the bores 84 and 87 to attain the lock, the valve-open or valve-closed state can be maintained to prevent the malfunction of the ball valve disc 11.

Thus, in the valve body 10, since the structure is adopted, in which the opening 65 of the stopper plate 61 fixed in the vicinity of the shaft mounting part 10d of the body 10a is provided therein with the engaging parts 66, the locking parts 72 of the rotation member 69 fixed so as to be rotated together with the valve shaft 12 are locked at the engaging parts 66 in the state positioned within the opening 65, and the stopper plate 61 and rotation member 69 are uniquely attached to the body 10a by means of an incorporation structure different from that of the gland member 32 and gland bolt 30, when the lever handle 88 is rotated to rotate the stopper 70 (ball valve disc 11), the stopper 70 does not come into contact with the members pertaining to the sealability of the gland member 32 or gland bolt 30. Therefore, when the stop function is fulfilled through the rotation of the vale shaft 12 up to the open or closed state, high sealability can infallibly be maintained without inducing an adverse effect on the sealability of the shaft seal packing 14 tightened by the gland member 32 without exerting any force on the gland member 32 or gland bolt 30.

Furthermore, it is unnecessary to provide a projecting pin or the like for stopping the rotation on the upper side of the body 10a and, since the rotation member 69 can be stored within the stopper plate 61, the height from the body 10a to the upper surface of the valve shaft 12 can be maintained low. In addition, there is no need to newly subject the body side to a cutting work for forming an internal thread for helically engaging with a screw pin for stopping the rotation and, therefore, there is no case where the cost is increased. Accordingly, it is possible to cope with both the manual operation and the automatic operation to fabricate a product in compliance with the international standard or other standards.

When assembling the valve body 10, the bolt holes 10i formed in the body 10a for attaching the actuator are utilized without any modification to fix the stopper plate 61. Therefore, no excess processing is required to easily attain the assemblage while reducing the fabrication cost and to enable enhancement of the workability at the time of the assemblage.

Furthermore, after the assemblage the stopper 70 is in the state stored in the opening 65 and, by attaching the key lock plate 80 from above, the movable part of the stopper 70 is not exposed to the outside. In addition, since the projecting piece 82 of the key lock plate 80 does not project outward from the locking plate part 64 to prevent the hands from being marred in the manual operation, high safety can be secured. At this time, since the stopper 70 and stopper plate 61 are movable through the surface contact, no gap is formed between them to further prevent the hands from being marred with exactitude.

Furthermore, since a contact face 61a of the stopper plate 61, with which the locking part 72 comes into contact, is provided in the shaft-center direction, the engaging parts 66 on which the contact face 61a is provided is formed in the direction orthogonal to a flow passage. Therefore, there is no need to excessively enlarge the width of the stopper plate 61, thereby enabling interference between the stopper plate 61 and the gland bolt 30 to be avoided infallibly.

Subsequently, the functions of the shaft seal packing and shaft seal structure for the valve according to the above embodiment of the present invention will be described. In FIG. 3, when initially pressing the shaft seal packing 14 before use of the valve body 10, since the inclined angles δ of the shaft seal packing 14 on the inner-diameter side (on the side of contact with the valve shaft 12) are the same, as shown in FIG. 8, the stacked layer faces 16a and 17a are brought into tight contact by surface contact with each other to retain the inclined angles δ to be a constant angle (48°).

Figure 6:
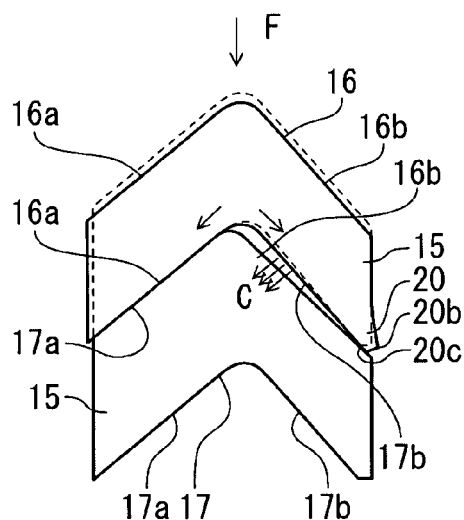
FIG. 6 includes explanatory views showing an operation made when a gland is tightened with a bolt.
Figure 6:
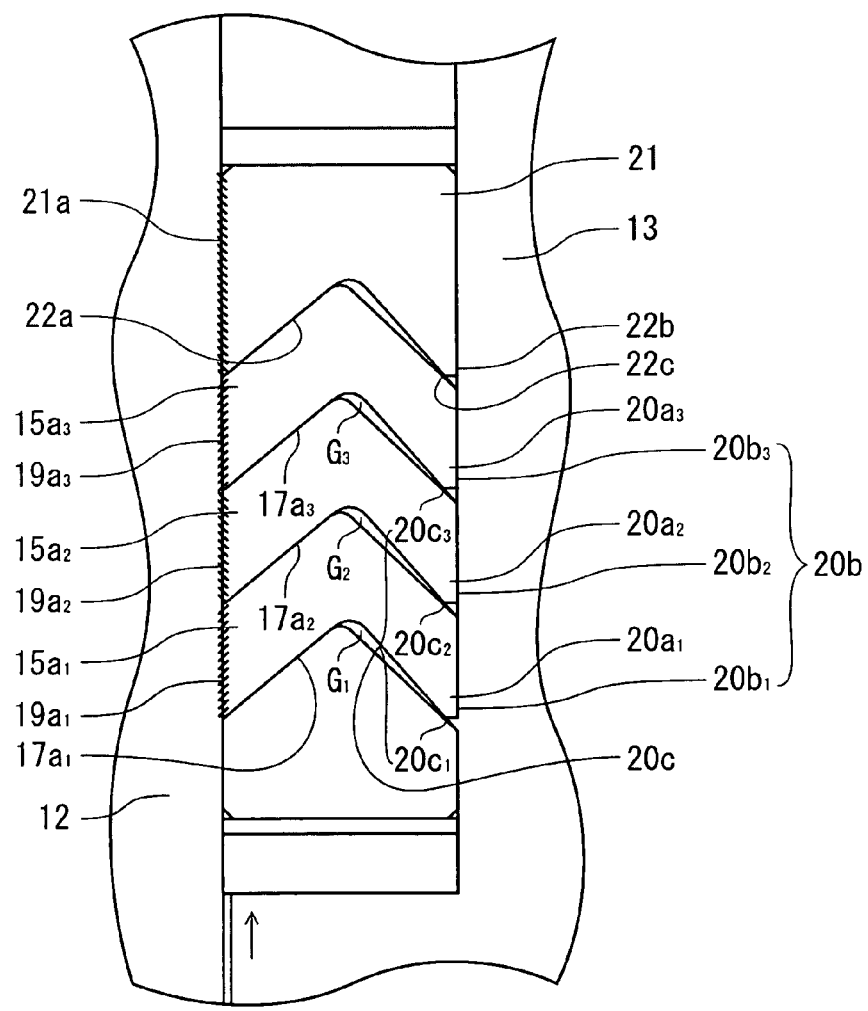

When the gland bolt 30 is tightened in the above state, a load F is exerted as shown in FIGS. 3 and 6 to urge the upper packing bodies 15 toward the lower packing bodies 15. Assuming that the left side in the drawing is called the inner-diameter side (valve shaft 12 side) and that the right side is called the outer-diameter side (shaft seal chamber 13 side), the upper packing bodies 15 is urged to open laterally along the mountain-side inclined faces of the lower packing bodies 15. Owing to the tight contact between the inner-diameter side stacked layer faces 16a and 17a at the inclined angle δ and the gaps G formed between the outer-diameter side stacked layer faces 16b and 17b, the upper packing bodies 15 slide toward the inner-diameter side along the inclined angles δ, thereby converting the tightening load in the axial direction into a force in the inner-diameter direction by means of the inclined angles δ of the stacked layer faces 16a and 17a. That is to say, the thrust load in the axial direction is converted to a radial load in the diametrical direction, and by means of this load the inner and outer peripheral surfaces 19 and 12e are sealed.

At this time, on the inner-diameter side, since the inner-diameter side stacked layer face 17a of the upper packing bodies 15 are brought into entire contact (surface contact) with the inner-diameter side stacked layer face 16a of the lower packing bodies 15, the upper packing bodies 15 are moved in parallel so as to slide toward the inner-diameter side to bring the inner peripheral surface 19 of the packing bodies 15 into surface contact with the valve shaft 12 to attain a seal. Incidentally, the surface contact seal is fulfilled also in the case of the seal utilizing self-sealability in which a force is exerted from below to press the packing upward by means of the fluid pressure (internal pressure).

On the other hand, on the outer-diameter side (shaft seal chamber 13 side), the valley-side angle $\theta_2$ is set to be 39° and the mountain-side angle $\theta_1$ is set to be 45°. By the angle difference of 6°, with the inside contact part 20c of the lip part 20 as a starting point, the gaps G are formed between the upper and lower packing bodies 15. When the tightening force of the gland member 32 has been exerted on or the fluid pressure has been applied to the shaft seal packing 14, the packing bodies 15 can smoothly slide toward the outer-diameter side along the inclined angle δ owing to the presence of the gaps G secured.

At this time, as shown in FIG. 6, since the lip part 20 on the outer-diameter side stacked layer face 17b of the upper packing body 15 comes into partial contact with the outer-diameter side stacked layer face 16b of the lower packing body 15, a force is concentrically exerted on the lip part 20 to urge the neighborhood of the lip part 20 to partially spread toward the outer-diameter side along the mountain-side angle $\theta_1$ of the outer-diameter side stacked layer face 16b. By this spreading force, the lip part 20 is pressed against the shaft seal chamber 13 by line contact to attain a seal.

Thus, the sealing force is exerted on the inner peripheral surface 19 in contact with the valve shaft 12 on the inner-diameter side of the packing body 15 and on the outside contact part 20b of the lip part 20 in contact with the shaft seal chamber 13 on the outer-diameter side thereof. In the relation of the upper packing bodies 15 to the lower packing bodies 15, the sealing force is exerted through the contact between the inner-diameter side stacked layer face 17a and the inside contact part 20c of the lip part 20. In addition, since the gap G is urged to move in the left lower direction by means of the overlap between the inner-diameter side stacked layer faces 16a and 17a, the gap is narrowed toward the direction C in FIG. 6(a). Though the sealing effect by repeated tightening (retightening) can be obtained insofar as the gap G does not disappear, since the surface contact on the inner diameter side is highly dense, the gap G is not easy to completely disappear.

Incidentally, a reaction force is exerted on the side of the gap G, as shown in a dotted line in FIG. 3, as a reaction force of the radial load in the diametrical direction on the inner-diameter side of the packing body 15. However, since the stacked layer faces 16a and 17a on the inner-diameter side of the packing body 15 are in surface contact with each other, the packing body is suppressed from moving toward the side of the gap G to maintain a seal relative to the valve shaft 12 by the surface contact. Thus, high sealability can be secured at the time of initial pressing.

Figure 5:
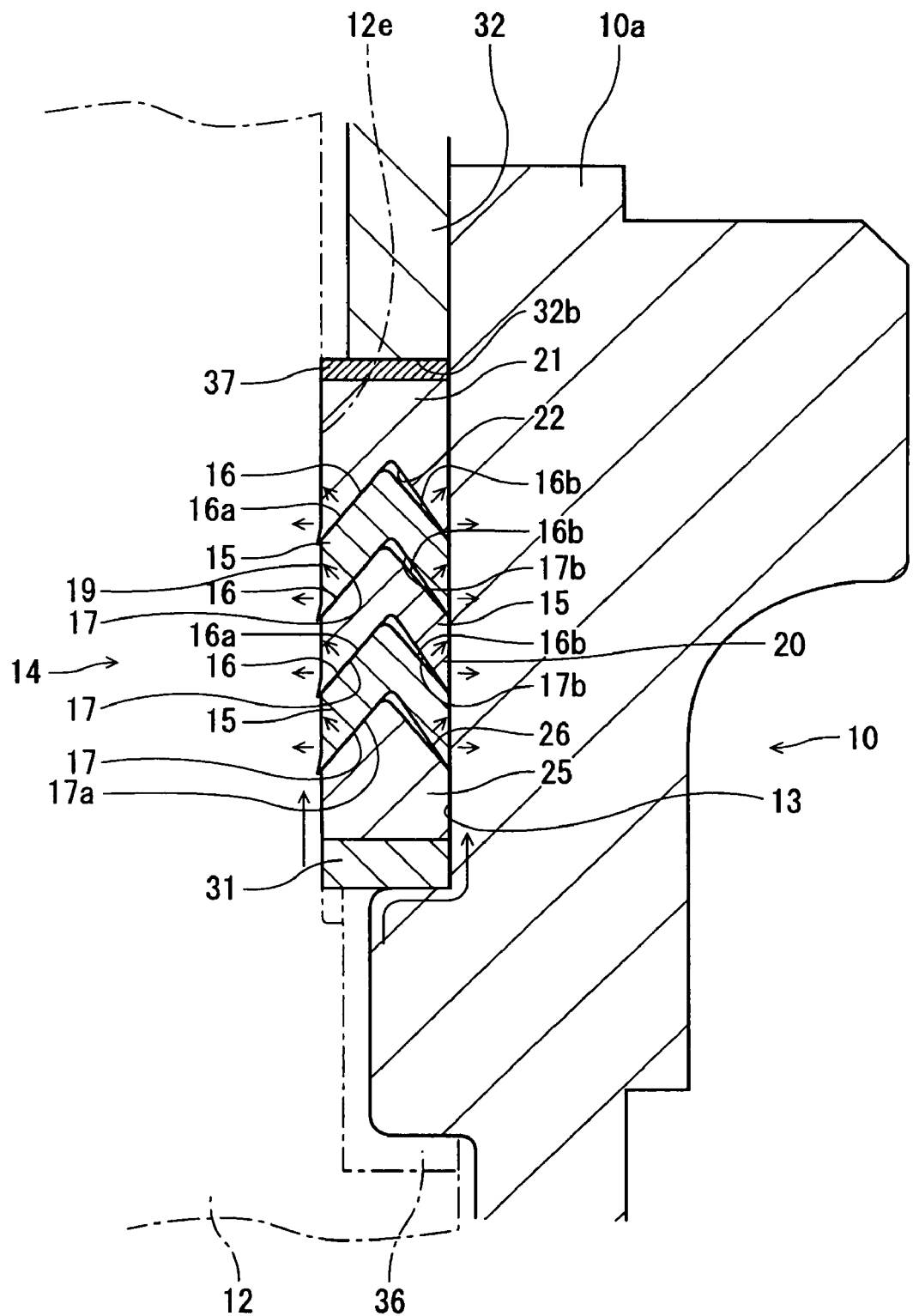
FIG. 5 is an explanatory view of the principle, showing a state assumed when having received fluid pressure in the valve of FIG. 1.

Next, the case of applying the fluid pressure (internal pressure) to the inside of the valve body 10 as shown in FIG. 5 will be described. In the initially tightened state, in FIG. 6($b$), the sealing force is exerted on the inner peripheral surfaces 19 ($19a_1$, $19a_2$ and $19a_3$), outside contact parts 20$b$ ($20b_1$, $20b_2$ and $20b_3$), inner-diameter side stacked layer faces 17$a$ ($17a_1$, $17a_2$ and $17a_3$) and inside contact parts 20$c$ ($20c_1$, $20c_2$ and $20c_3$) of the packing bodies 15 ($15a_1$, $15a_2$ and $15a_3$), respectively. In addition, at the same time, the sealing force is exerted on an inner peripheral face 21$a$, outside contact part 22$b$, inner-diameter side stacked layer face 22$a$ and inside contact part 22$c$ of the top adapter 21, respectively.

In FIG. 7, when the fluid flows in the valve body 10 to allow the shaft seal packing 14 to receive the fluid pressure, an axial force for pushing up the bottom adapter 25 from below is exerted on the shaft seal packing 14 and, by the sealing effect of the inner peripheral surface $19a_1$, outside contact part $20b_1$, inner-diameter side stacked layer face $17a_1$ and inside contact part $20c_1$, the bottom adapter 25 is wholly lifted. When the upward force is exerted on the bottom adapter 25, this force is converted to a load in the diametrical direction (on the inner-diameter side) by means of the action of the tapered faces of the stacked layer faces 16$b$ and 17$b$ to cause the inner peripheral surface 19 to press the outer peripheral surface 12$e$ to attain a surface pressure seal.

On the other hand, on the outer-diameter side (shaft seal chamber 13 side), since the valley-side angle $\theta_2$ of the shaft seal packing 14 is 39° and the mountain-side angle $\theta_1$ thereof is 45° before the fluid pressure is applied, the gaps G can be secured by the angle difference of 6°. When the force by the fluid pressure is applied from below, this force becomes a force for pushing up the bottom adapter 25 from below and is converted via the lip part 20 in line contact with the outer-diameter side stacked layer face 16$b$ to a load in the diametrical direction (on outer-diameter side). Thus, the line contact seal can be attained while fulfilling a strong sealing force by the lip part 20 and shaft seal chamber 13, thereby enabling the exertion of self-sealability by the fluid pressure. Since the gaps G are simultaneously secured in the shaft seal packing 14, the fluid pressure enters the gaps G and, as a result, the stacked layer face 17$b$ that is the lower stacked layer face on the outer-diameter side is wholly pressurized to exert a force for pushing and spreading the stacked layer face 17$b$ toward the outer-diameter side. Thus, the self-sealability can be further enhanced because the lip part 20 is more strongly pressed against the shaft seal chamber 13 side. Therefore, the gap G secured on the outer-diameter side of the packing body 15 enables the entire packing body 15 to be easy to move to the inner-diameter side and is important in order to maintain the sealability on the inner-diameter side and the sealability on the outer-diameter side of the shaft seal packing 14.

The packing body $15a_1$ is urged to move leftward at the time of the above shaft seal to heighten the surface pressure of the inner peripheral face $19a_1$, raise the lip part 20 and increase the sealing effect in the state of FIG. 6($a$), thereby obtaining a high sealing force by the inner peripheral surface $19a_1$, outside contact part $20b_1$, inner-diameter side stacked layer face $17a_1$ and inside contact part $20c_1$. The sealing effect is similarly exerted on the packing bodies $15a_2$ and $15a_3$ and on the top adapter 21, thereby fulfilling an excellent sealing function.

If the shaft seal packing 14 should encounter stress relaxation to weaken the sealing force of the inner-diameter side stacked layer face $17a_1$ and inside contact part $20c_1$, as shown in FIG. 6($b$), pressure enters the gap $G_1$, thereby inducing a force for spreading the V-shape of the packing body $15a_1$ to obtain a self-sealing force for heightening the sealability of the outside contact part $20b_1$.

In addition, on the inner-diameter side, since pressure enters the inner-diameter side stacked layer face $17a_1$, the packing body $15a_1$ is opened to heighten the surface pressure of the inner peripheral surface $19a_1$. However, since an upward force is simultaneously exerted on the packing body $15a_1$, the packing body $15a_1$ is urged to move rightward in the drawing by the inclination of the inner-diameter side stacked layer face $17a_2$ to weaken the sealing force by the inner peripheral surface $19a_1$, thereby securing the sealability by the inner peripheral surface $19a_2$, inner-diameter side stacked layer face $17a_2$ and outside contact part $20b_1$.

On the other hand, the inner peripheral surfaces $19a_1$, $19a_2$ and $19a_3$ are worn away by the rotation of the valve shaft 12 to gradually weaken the sealing force. However, since a force for moving the upper packing bodies toward the inner-diameter side (for heightening the surface pressure of the inner-diameter side) is greatly exerted on the shaft packing 14 by means of the sealing effect in FIG. 6($a$), even when the inner peripheral surfaces $19a_1$, $19a_2$ and $19a_3$ are worn away at the same time, the sealability is weakened sequentially from the lower packing bodies. For this reason, the individual packing bodies can maintain their sealability and generate a leak between the adjacent packing bodies, thereby enabling a simultaneous leak to the outside to be prevented from occurring.

Since the inner-diameter sides of the packing bodies 15 are sealed by surface contact at the time of the initial pressing and since there is few gaps between the packing bodies and the valve shaft 12, the packing bodies are little deformed and there is a little room to vary the packing volume, thereby enabling the stress relaxation to be suppressed.

Incidentally, though there is a case where the volume variation of the packing reaches the gaps G, the seal of the inner-diameter side of the packing bodies 15 relative to the valve shaft 12 is maintained by the surface contact, whereas the volume of the gaps G on the outer-diameter side of the packing bodies 15 is set to surpass the volume variation by the creep phenomenon or thermal expansion of the packing to secure the gap G at all times. Therefore, it is possible to exert the self-sealability by the fluid pressure and maintain the sealability relative to the shaft seal chamber 13 by the line contact.

Figure 4:
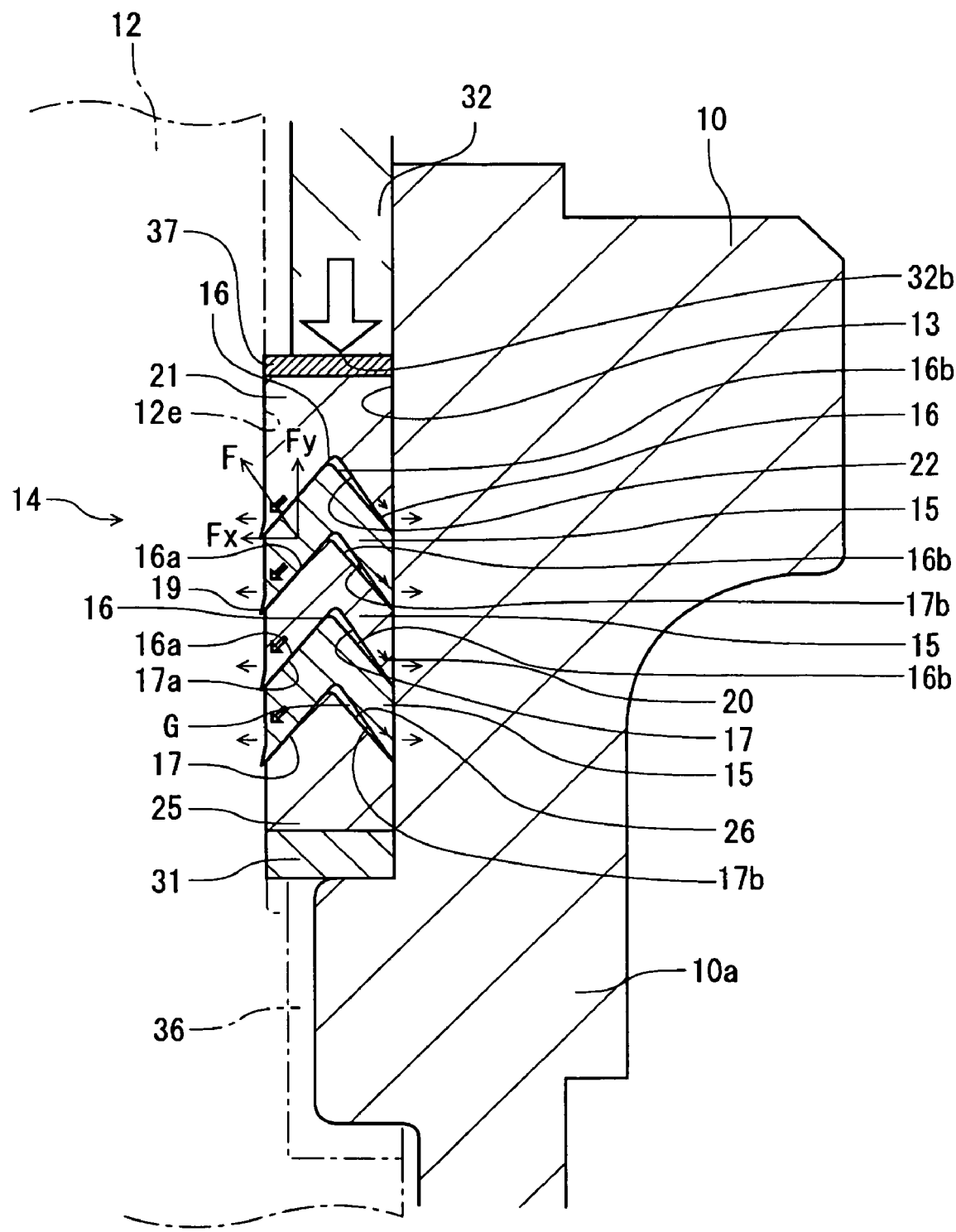
FIG. 4 is an explanatory view of the principle, showing a state assumed at a time of pressing by retightening in the valve of FIG. 1.

Next, retightening performed when the stress relaxation or wear has been generated in the shaft seal packing 14 to deteriorate the sealability will be described. In FIG. 4, when the gland member 32 has been retightened, the stacked layer faces 16$a$ and 17$a$ are brought into tight contact with each other on the inner-diameter side of the shaft seal packing 14. At this time, since the inclined angle $\delta$ of 48° is retained constant, the thrust load is converted to the radial load. Though the lower end of the inner peripheral surface 19 of the shaft seal packing 14 is urged to slide in a direction projecting toward the outer peripheral surface 12$e$ side of the valve shaft by means of the strong pressing force in consequence of the retightening, the pressing force is exerted on the stacked layer faces 16$a$ and 17$a$. Consequently, since the packing is entirely urged to slide toward the inner-diameter side, the pressing force becomes a force for pressing the inner peripheral surface 19 against the outer peripheral surface 12$e$ by surface contact. Thus, even when the retightening is performed, the creep phenomenon is difficult to generate and, since a dimensional variation in the height direction is small, the stress relaxation or permanent set in fatigue is suppressed and, at the same time, the gaps G are secured above a certain level. For this reason, the retightening of the gland member 32 enables strong seal surface pressure to be applied again between the shaft seal packing 14 and the valve shaft 12 to restore the sealability to its original state.

At this time, the force is exerted from one packing body 15 to another packing body 15 as a reaction force. When the force F is dissolved into components in the X-direction and Y-direction to obtain component forces Fx and Fy. When a tightening force has been applied, a reaction force is exerted in the diametrical direction by means of the component force Fx to enable fulfillment of seal surface pressure. Since the inclination of the angle δ of the packing body 15 is toward the inner-diameter side, when the pressing force has been applied, the packing body 15 is deformed as shrunk on the inner-diameter side to produce surface pressure relative to the valve shaft 12, thereby enabling the shaft seal with high sealability.

On the other hand, on the outer-diameter side of the packing body 15, the lip part 20 is pushed and spread in the outer-diameter direction similarly at the time of the initial pressing while the shaft seal packing 14 and shaft seal chamber 13 are brought into line contact with each other by the same function as in the case of FIG. 3 to obtain a seal. As a result the same sealing force as in FIG. 3 is restored to its original state. At the time of the retightening, the entire shaft seal packing 14 is moved to the inner-diameter side to reduce the gap G. However, since the gap G does not completely disappear, a prescribed space can be secured.

As described above, when the initial tightening and retightening force has been exerted on or fluid pressure has been applied to the shaft seal packing 14, the outer peripheral surface 12e of the valve shaft can be subjected to a surface contact seal on the inner-diameter side of the shaft seal packing 14 to convert the pressing force in the axial direction to a force in the diametrical direction by the inclined angle δ and, at the same time, the force for urging the shaft seal packing to move toward the inner-diameter side enhances the sealing force. The seal by the surface contact enables the strength of the seal part of the sliding section to be enlarged and to endure wear. Thus, the valve shaft 12 can freely be rotated while securing the sealability of the valve shaft 12.

On the other hand, the shaft seal chamber 13 can be subjected to a line contact seal on the outer-diameter side of the shaft seal packing 14 to concentrate the surface pressure and heighten the sealability. Thus, since the fixed section is sealed on the outer-diameter side, there is no fear of inducing wear and, since high strength is not required, the line contact seal fulfilling a higher sealing force than the surface contact seal can be acquired. Since the apexes 16c and 17c of the packing body 15 are eccentric, the gap G can be secured between the upper and lower packing bodies to further enhance the sealing force in the presence of the gap G.

Figure 9:
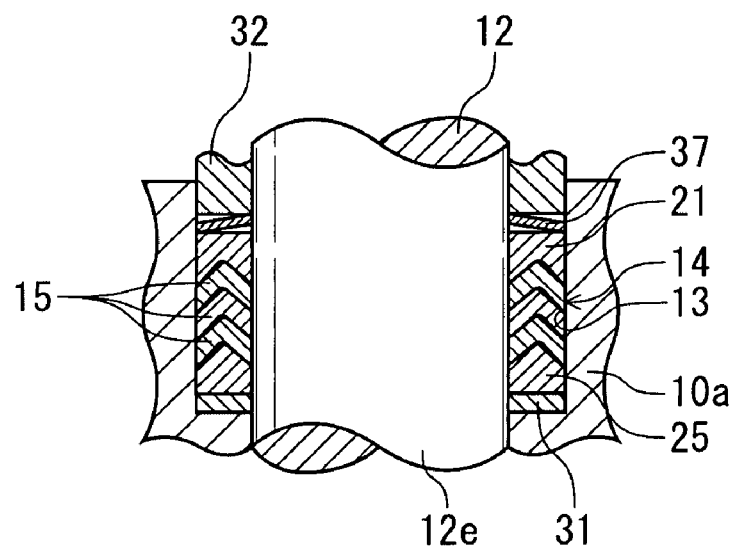
FIG. 9 includes cross sections showing one example of a gland washer.
Figure 9:
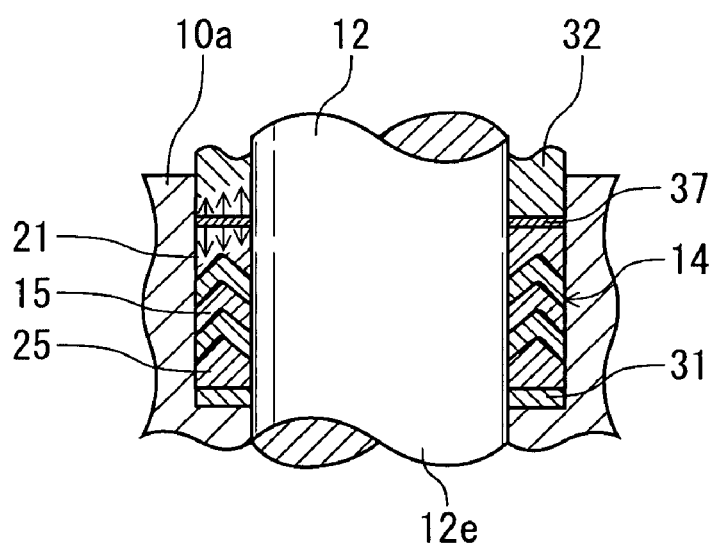

In addition, even when the shaft seal packing 14 is thermally expanded or shrunk by means of a high-temperature or low-temperature fluid or a variation of the surrounding temperature, as shown in FIG. 9, the conical disc spring washer 37 can heighten the surface pressure between the outer-diameter side of the shaft seal packing 14 and the shaft seal chamber 13. Particularly, even at a low temperature, the surface pressure (frictional force) on the outer-diameter side of the shaft seal packing 14 can be made higher than on the inner-diameter side to enable preventing the shaft seal packing 14 from being rotated following the rotation of the valve shaft. Therefore, the static sealability between the shaft seal packing 14 and the valve seal chamber 13 can be maintained while securing the dynamic sealability between the shaft seal packing 14 and the valve shaft 12. Furthermore, in the state of FIG. 9(b), since the surface pressure also required for the inner-diameter side is applied, the sealability on the inner-diameter side of the packing body 15 can also be secured.

Figure 10:
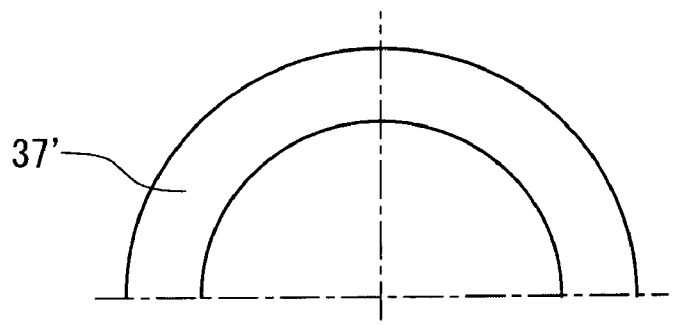
FIG. 10 includes explanatory views showing another example of the gland washer, (a) being a plan view of the gland washer, (b) being a cross section of the gland washer and (c) being a cross section showing a state in which the gland washer has been attached.
Figure 10:
Figure 10:
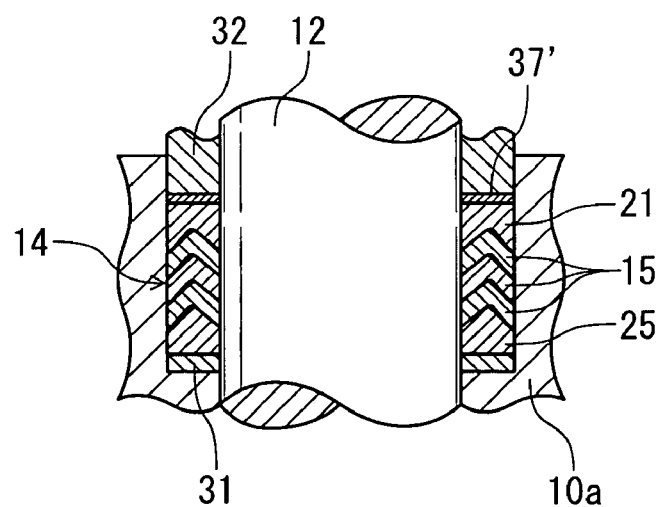

In this case, as shown in FIG. 10, by crimping the gland washer, providing the lower side of the gland washer with the convexo-concave parts or degrading the accuracy of the coarseness of the finished surface of the shaft seal chamber 13, the frictional resistance between the gland washer and the shaft seal packing 14 is enlarged or, by integrating these, the shaft seal packing 14 can be prevented from being rotated following the rotation of the valve shaft 12 as described above, thereby enabling fulfillment of excellent shaft seal performance similarly to the above case.

Figure 11:
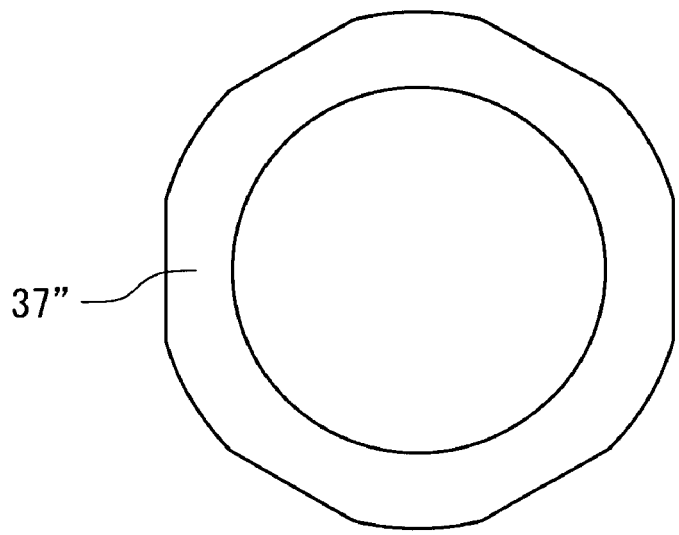
FIG. 11 includes explanatory views showing still another example of the gland washer, (a) being a plan view of the gland washer, (b) being a plan view showing a state in which the gland washer has been attached and (c) being an end view taken along line A-A in (b).
Figure 11:
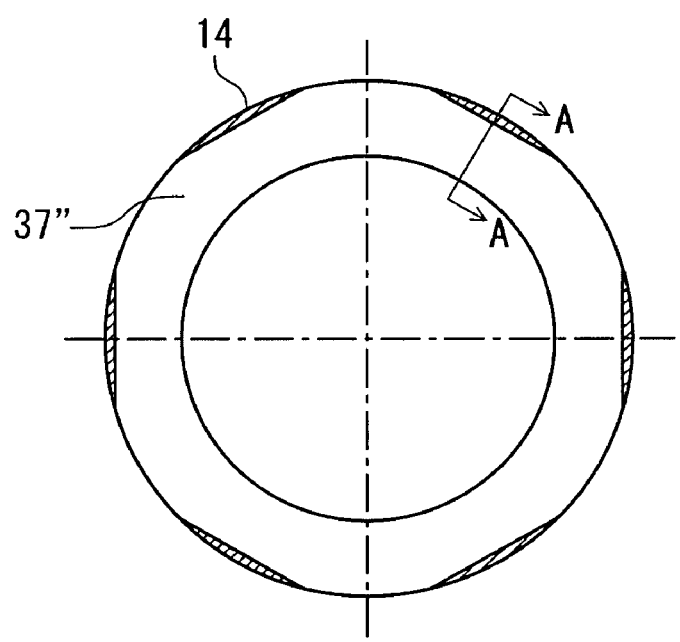
Figure 11:
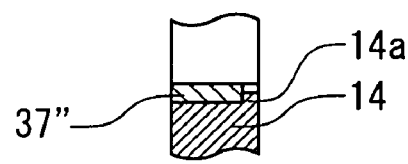

Furthermore, as shown in FIG. 11, in the case where the gland washer 37" is formed on the outer periphery thereof at appropriate intervals with the cutout parts 39, the gland washer 37" and shaft seal packing is made integral by means of the bulging parts 14a as described above to prevent the shaft packing 14 from being rotated following the rotation of the valve shaft 12, thereby enabling enhancement of the shaft seal performance.

In the meanwhile, the floating ball valve as shown in FIG. 1 has a structure in which the ball valve disc 11 is pushed toward the downstream side by a fluid and brought into tight contact with the seat ring 38 to close the flow passage. Therefore, the valve shaft 12 for operating the rotation of the ball valve disc 11 is rotated in a slightly eccentric state with the movement of the ball valve disc 11. Since the inner-diameter side of the shaft seal packing 14 is the section coming into slide contact with the rotating valve shaft 12, it is in nature eccentrically worn away or deformed with ease by the eccentricity of the valve shaft 12. According to the present invention, the tightening load of the gland bolt 30 is supported on the inner-diameter side of the shaft seal packing 14, and this load is utilized to exert a force for urging the entire packing to move along the stacked layer faces 16a and 17a having the constantly retained inclined angle δ toward the inner-diameter side, thereby strongly press the valve shaft 12 in the outer peripheral direction to enable generation of a binding force with the entire surface. For this reason, it is possible to set right the eccentricity of the valve shaft 12 and prevent eccentric wear or deformation of the shaft seal packing 14.

Furthermore, since the valve shaft 12 is supported on the lower side thereof by means of the stem bearing 36 and on the upper side thereof by means of the gland bush 35 and gland washer 37, the eccentricity of the valve shaft 12 owing to an eccentric force exerted through a handle operation not shown and a force for moving the ball valve disc 11 toward the flow passage by means of the fluid pressure can be prevented to enhance durability of the shaft seal structure.

On the other hand, since the outer-diameter side of the shaft seal packing 14 is a section for sealing the fixed section relative to the body 10a, it is difficult to wear away. Since the gaps G between the packing bodies 15 are secured here, the self-sealability can be secured over a long period of time.

Incidentally, the foregoing description has been given mainly to the case where the inner and outer peripheries of the shaft seal packing 14 are the sections fulfilling the sealing function. However, it goes without saying that the inner and outer peripheries on the lower side of the top adapter 21 and the inner and outer peripheries on the upper side of the bottom adapter 25 similarly function as seal sections. In addition, though the above embodiment has set the downward tapered surface that directs the inclination direction of the tapered surface to the ball valve disc 11 side, an upward tapered surface may be adopted when the fluid flowing within the valve body 10 has negative pressure.

Since the packing body 15 has a special V-shape, in which the apexes 16c and 17c are made eccentric to form the mountain-side angle $\theta_1$ and valley-side angle $\theta_2$ made different and the relation of the mountain-side angle $\theta_1$>the valley-side angle $\theta_2$ is satisfied, it can have seal characteristics peculiar to those on the inner-diameter side and those on the outer-diameter side. Furthermore, by the self-sealability utilizing the fluid pressure, sealing can be attained with a small tightening force. Since the packing bodies 15 are made of a resin, the gaps G are secured to fulfill excellent seal characteristics without being deformed greatly like rubber. Though the shaft seal packing 14 may be formed of any of various resins, by forming the shaft seal packing of a fluorine resin, such as PTFE, its performance can further be heightened.

An ordinary V-packing has a tightening surface pressure of 15N/mm$^2$, whereas the shaft seal packing 14 can suppress the seal surface pressure to around 10 to 20%. Since the tightening surface pressure can be reduced, even when a stress relaxation phenomenon is generated with time or by temperature variation to lower the seal surface pressure, the sealability can be restored to its original state to maintain high sealability.

In addition, since the shaft seal packing 14 has the inclined angle $\delta$ to obtain tight contact on the inner-diameter side, it is possible to prevent deformation of the lip part 20 by the tightening force at the time of retightening and deformation of the inner-diameter side by the rotation of the valve shaft 12, thereby enabling the durability to be enhanced.

The shaft seal packing 14 is easy to mold because the outer-diameter side stacked layer face 17b of the lower valley-shaped stacked layer face 17 is tapered, and applicable to other shaft seal packing without any modification of the relation among the valley-side angle $\theta_2$ of the stacked layer face 17b, the mountain-side angle $\theta_1$ of the inner-diameter side stacked layer face 17a and the eccentric amount e. Therefore, the shaft seal packing 14 can readily be fabricated even when the diameters and sizes of the packing bodies 15 are made different in accordance with the size of the valve body 10.

Figure 14:
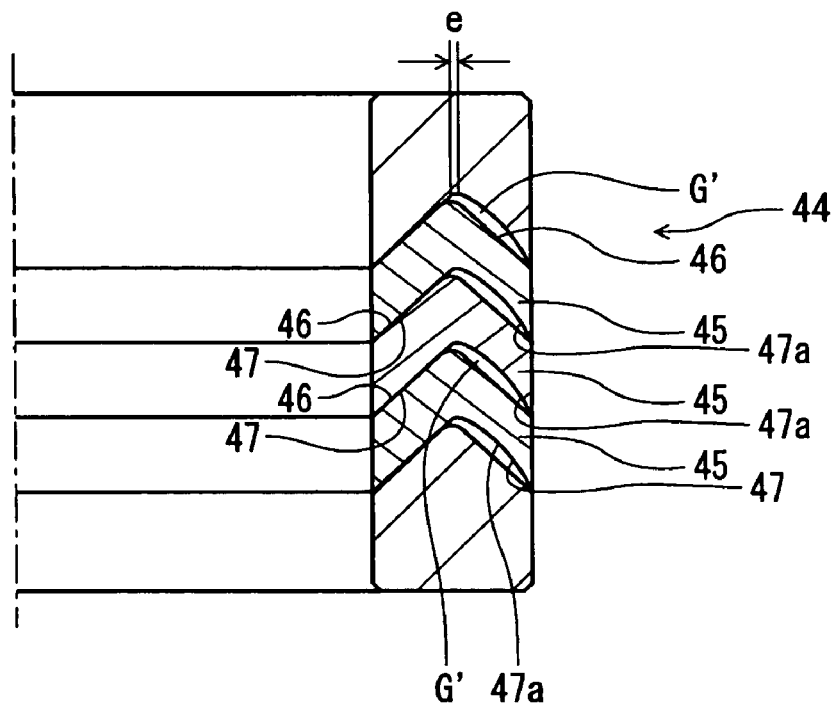
FIG. 14 is a cross section showing the shaft seal packing according to another embodiment of the present invention.

FIG. 14 shows a shaft seal packing according to another embodiment of the present invention. In this shaft seal packing 44, an upper stacked layer face 46 and a lower stacked layer face 47 of each packing body 45 have an eccentric amount e, and the lower stacked layer face 47 has an outer-diameter side stacked layer face 47a formed in a round shape. In this case, though the round shape is slightly inferior in rigidity to the tapered shape, larger gaps G' can be secured to enable heightening the sealability on the outer-diameter side.

Figure 15:
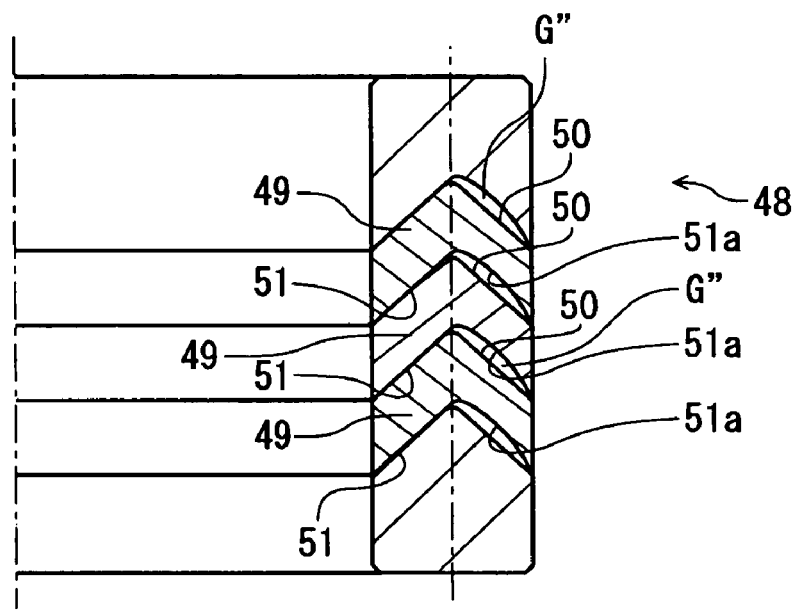
FIG. 15 is a cross section showing the shaft seal packing according to still another embodiment of the present invention.

FIG. 15 shows a shaft seal packing according to still another embodiment of the present invention. In this shaft seal packing 48, an upper stacked layer face 50 and a lower stacked layer face 51 of each packing body 49 have no eccentric amount, and the lower stacked layer face 51 has an outer-diameter side stacked layer face 51a formed in a round shape. In this case, the thickness of the outer-diameter side can be made larger as compared with the case provided with the eccentric amount to compensate for the strength of the outer-diameter side that becomes small in thickness. Thus, the shaft seal packing can also be formed without any eccentricity between the apexes of a mountain side and a valley side. Also in this case, similarly to the above case, larger gaps G" can be secured to enable heightening the sealability on the outer-diameter side.

As described above, in the shaft seal packing of the present invention, since the valley-side apex 17c of the packing body 15 is made eccentric in the outer-diameter direction relative to the mountain-side apex 16c thereof, a gap G is formed between stacked layer faces of the packing body 15 on the outer-diameter side similarly to the prior art and, in addition thereto, a gap G is also formed in the vicinity of the valley-side apex 17c on the inner-diameter side (refer to FIG. 3). The gap G on the inner-diameter side does not contribute to the self-sealability of the shaft seal packing, but functions as a section not to prevent the packing body 15 to slide along the tapered inner-diameter side stacked layer toward the inner-diameter side.

Since the upper and lower stacked layer faces brought into tight contact with each other in the inclined state on the inner-diameter side allow the inner-diameter side of the packing body 15 to wholly slide toward the inner-diameter side at the time of pressing the shaft seal packing 14, the inner peripheral surface 19 of the packing body 15 is entirely pressed perpendicularly against the valve shaft to form a surface contact, thereby enabling maintenance of the sealability of the inner peripheral surface easy to wear away.

In addition, since the gap G exists in the outer peripheral surface of the packing body 15, the lip part 20 can be pressed against the upper stacked layer face at the time of pressing the shaft seal packing 14 to press this section against the shaft seal chamber 13 and form a line contact, thereby enabling maintenance of the sealability of the outer peripheral surface. Furthermore, since the stacked layer faces on the inner-diameter side of the shaft seal packing of the present invention are brought into tight contact with each other, the gap G on the outer-diameter side is secured to enable the self-sealability by the fluid pressure to be fulfilled.

Therefore, in the shaft seal packing of the present invention, the sealability heightened in orientation in the inner-diameter direction, in which the rotating, ascending and descending sections easy to deteriorate the sealability, i.e. the dynamic sections, are sealed, can be obtained while the same sealability as conventionally in the outer-diameter direction, in which the static sections including the shaft seal chamber 13 are sealed, can be secured.

Though the case where the valve shaft packing of the present invention has been applied to the ball valve, for example, has been described, the valve shaft packing can be applied to other valves that the ball valve, including different rotary valves and ascending and descending valves, such as gate valves. Furthermore, the valve shaft packing can be utilized for shaft seal structures other than the shaft seal structure for a valve and applied to various shaft mounting portions.

EXAMPLE 1

Packing bodies having different tapered angles were tested for seal surface pressure in order to set the mountain-side angle $\theta_1$ and valley-side angle $\theta_2$ of the shaft seal packing of the present invention. Valve samples used were floating ball valves made of 10 K stainless steel and possessed of a size of 50A. In addition, the shaft seal packing was comprised of five rings stacked one on top of another, made of PTFE (inside diameter: 22 mm×outside diameter: 30 mm×height: 13.5 mm) and formed in a symmetrical V-shape in cross section.

The minimum tightening torque capable of sealing air pressure of 0.6 MPa by a bolt-nut was measured, provided that the relation of t=0.45 W was satisfied, when the ring width of the packing body was expressed as W and the height of a vertical surface part connecting the upper stacked layer face 16 and lower stacked layer face 17 (seal height) was expressed as t, thereby measuring the seal surface pressure.

Each sample had the relation of the mountain-side angle $\theta_1'$ (mountain-side angle $\theta_1 \times 2$)>the valley-side angle $\theta_2'$ (valley-side angle $\theta_2 \times 2$). The tapered angle $\theta_1'/\theta_2'$ of Sample 1 was 75°/70°, that of Sample 2 85°/80°, that of Sample 3 95°/90°, that of Sample 4 100°/95° and that of Sample 5 105°/100°.

As a consequence of measuring the seal surface pressure of each sample, it was found that Samples 1 and 5 had the seal surface pressure of 6 MPa and that the air pressure could be sealed by Samples 2, 3 and 4 having the seal surface pressure in the range of 2 to 4 MPa. Therefore, the range of the angles $\theta_1'/\theta_2'$ of Samples 2, 3 and 4 having the lower seal surface pressures from the comparison among all samples became the optimum angle range.

Next, the same tests as the above test were performed, with the angle $\theta_1'/\theta_2'$ fixed to be 100°/95° which was that of Sample 4 and the relation of the ring width W and seal height t set to satisfy t=0.3 W and t=0.55 W. As a result of the tests, it was found that the seal surface pressures when t=0.3 W and t=0.55 W were 10 MPa and 14 MPa, respectively, that were higher than that mentioned above. Therefore, the relation of t=0.45 W that was intermediate of the two was adopted as the optimal relation.

It came to a conclusion that in order to enable a seal to be attained with a small seal surface pressure, it was advantageous to apply the above optimum angle range to the shaft seal packing of the present invention and set the mountain-side angle $\theta_1$ (angle $\theta_1'/2$) to be 42.5 to 50° and the valley-side angle $\theta_2'$ ($\theta_2'/2$) to be 40 to 47.5° while satisfying the relation of the mountain-side angle $\theta_1 >$ the valley-side angle $\theta_2$.

EXAMPLE 2

Figure 16:
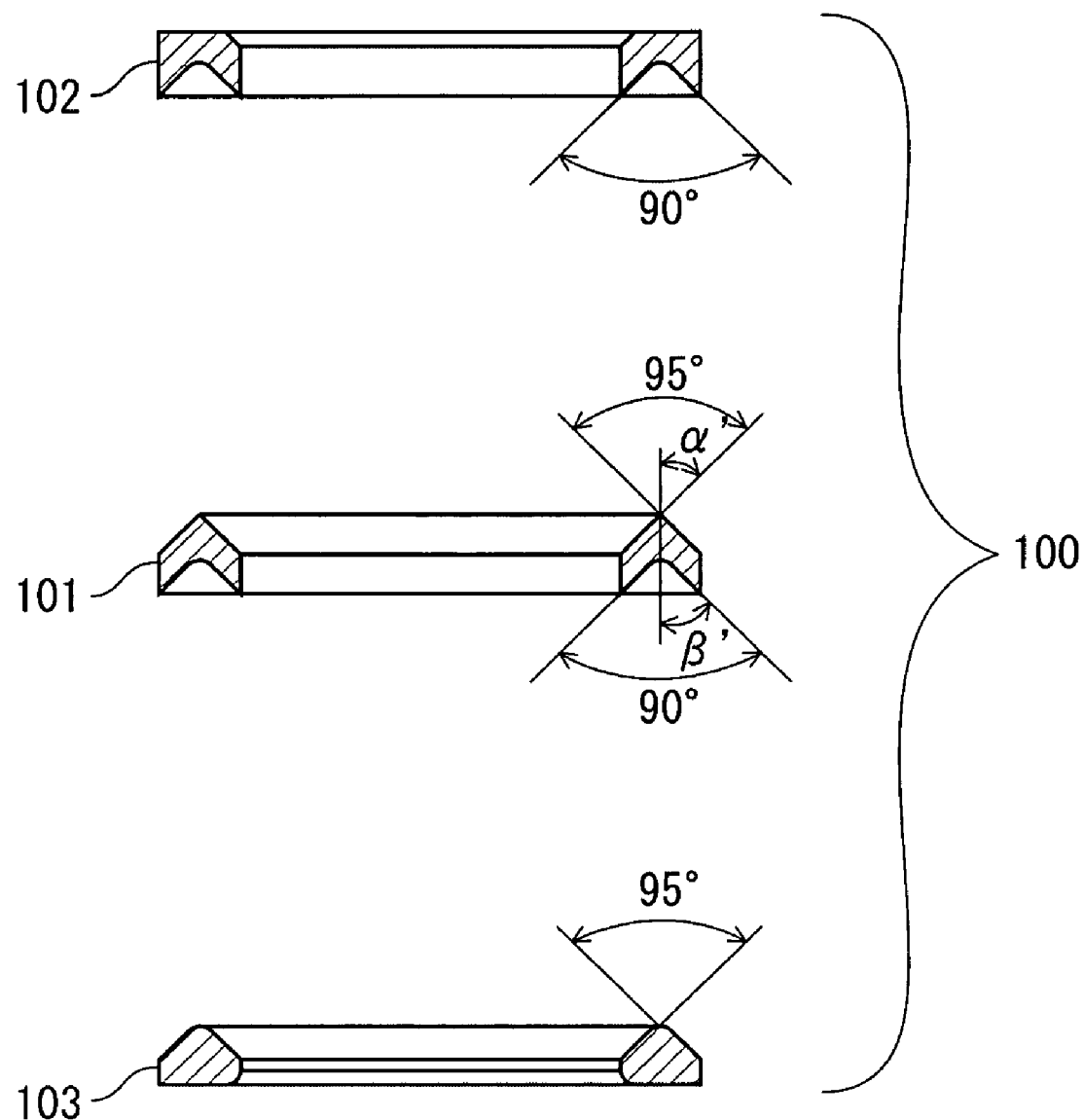
FIG. 16 is a cross section showing a V-packing.

Next, stress relaxation tests were performed relative to the shaft seal packing of the present invention. A ball valve of a nominal pressure of 10 K and a size of 50 A having a valve body made of SCS13A was used as a test valve. The shaft seal packing had dimensions of the inside diameter×outside diameter×entire height assumed when the packing bodies were integrally combined, which dimensions were 22 (mm)×32 (mm)×11.5 (mm). Two packing bodies were stacked one on top of the other, with the mountain-side angle $\theta_1$ and valley-side angle $\theta_2$ in FIG. 3 set to be 48° and 39°, respectively, and sandwiched between corresponding top and bottom adapters. On the other hand, a V-packing 100 shown in FIG. 16 and comprising two packing bodies 101 in a stacked state (not shown), similarly to the case of the present invention, having a mountain-side tapered angle α' of 47.5° (95/2) and a valley-side tapered angle β' of 45° (90/2), a corresponding top adapter 102 and a corresponding bottom adapter 103 attached to the packing bodies was used as a comparative example. These component parts were made of PTFE and the volumes thereof were substantially the same as those of Example 2.

Subsequently described was the test procedure comprising the steps of:

(1) heating the test valve to 40° C. and, in this state, keeping the same worm for 24 hours and, during this time, similarly heating each packing body and other component parts, (2) assembling the shaft seal packing (V-packing) under the environment of 40° C., with the assembling criteria that the tightening torque by the gland bolt (having a nominal diameter of M10) was 7 N·m and that the load of fluid pressure (air pressure) applied was 0.6 MPa, and confirming the sealability, (3) cooling the test valve to −5° C. and, in this state, keeping the temperature for 24 hours and, in this 24 hours, confirming the sealability under the conditions of the tightening torque by the gland bolt and the load of 0.6 MPa, (4) heating the test valve to 40° C. and, in this state, keeping the same worm for 24 hours and, in this 24 hours, confirming the sealability under the conditions of the tightening torque by the gland bolt and the load of 0.6 MPa and, when the tightening torque by the gland bolt was lower than the assembling reference value (7 N·m), performing retightening to obtaining the reference value, and (5) repeating steps (3) and (4) to confirm the sealability under the conditions of the tightening torque by the gland bolt and the load of 0.6 MPa. The results of the tests obtained are shown in Table 1 and graphitized in FIG. 17.

TABLE 1

| | Initial Stage (40° C.) | | In 24 hr (−5° C.) | | In 48 hr (40° C.) | | In 48 hr (40° C.) Retightened | | In 72 hr (−5° C.) | | In 96 hr (40° C.) | | In 96 hr (40° C.) Retightened | | In 120 hr (−5° C.) | |
|---|---|---|---|---|---|---|---|---|---|---|---|---|---|---|---|---|
| | I | II | I | II | I | II | I | II | I | II | I | II | I | II | I | II |
| Present Invention | 7 | No leak | 1 | No leak | 5 | No leak | 7 | No leak | 5 | No leak | 6 | No leak | 7 | No leak | 5.5 | No leak |
| Comp. Ex. | 7 | No leak | 0.5 | Leak | 3 | No leak | 7 | No leak | 3 | No leak | 5 | No leak | 7 | No leak | 3.5 | No leak |

*I: Bolt tightening torque (N·m), II: Sealability under 0.6 MPa

Figure 17:
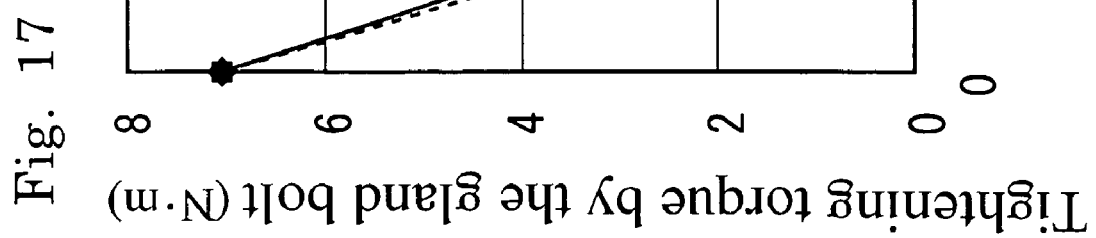
FIG. 17 is a graph showing results of the shaft seal packing having been subjected to a stress relaxation test.

It was found from the results of Table 1 and FIG. 17 that since the packing was shrunk the step of cooling to −5° C., the tightening torque by the gland bolt was lowered in 24 hours in each of the present invention and comparative example. It is conceivable that the reason for it is that the affection of lowered stress relaxation characteristics of the packing material (fluorine resin) per se will greatly occupy a large ratio. According to the shaft seal packing of the present invention, however, even in the state in which the tightening torque by the gland bolt has been lowered, it was confirmed that the self-sealability was maintained and that the seal can be attained under the condition of the air pressure load of 0.6 MPa.

In addition, since the packing was expanded by the temperature elevation to 40° C., the tightening torque by the gland bolt was restored in 48 hours. At that time, the present invention exhibited a higher ratio of restoration of the tightening force than the comparative example.

Furthermore, 72 hours after the re-cooling to −5° C. subsequent to retightening the gland bolt kept at 40° C., a drop of the tightening torque by the gland bolt was reconfirmed by the packing shrinkage. However, since the drop amount was suppressed more than the initial cooling (in 24 hours), the effect of suppressing the stress relaxation in the packing of the present invention was confirmed. The suppressing effect was similarly reproduced 120 hours after further temperature elevation to 40° C. and cooling to −5° C. Moreover, the amount of drop of the tightening torque by the gland bolt was suppressed more than that in 72 hours.

It was therefore confirmed from the tests results that since the present invention attained the surface contact on the inner-diameter side of the packing, exhibited small deformation and has a little room to vary the packing volume to reduce the stress relaxation, thereby fulfilling the enhancement of the seal surface pressure by pressing and self-sealability by the fluid pressure and confirming that the excellent sealability could be secured.

The invention claimed is:

1. A shaft seal packing comprising:
    annular packing bodies stacked and substantially V-shaped in cross section, with stacked layer faces on an inner-diameter side of the packing bodies brought into tight contact with one another and stacked layer faces on an outer-diameter side of the packing bodies formed with prescribed gaps between adjacent stacked layer faces,
    wherein a valley-side apex of each of the packing bodies is deviated from a mountain-side apex of thereof in an outer-diameter direction to make the mountain-side and valley-side apexes eccentric.

2. A shaft seal packing according to claim 1, wherein upper and lower stacked layer faces on the outer-diameter side of the packing bodies have different tapered angles to form the gaps.

3. A shaft seal packing according to claim 1, wherein a mountain-side angle is a tapered angle of an upper stacked layer face on the outer-diameter side of each of the packing bodies, and is in a range of 42.5° to 50°, a valley-side angle is a tapered angle of a lower stacked layer face on the outer-diameter side thereof, and is in a range of 40° to 47.5°, and a relation of the mountain-side angle>the valley-side angle is satisfied.

4. A shaft seal packing according to claim 1, further comprising a top adapter and a bottom adapter stacked on top and bottom sides of the stacked packing bodies, respectively, to constitute a shaft seal packing and wherein a valley side of the top adapter and a mountain side of the bottom adapter have same angles as the packing bodies.

5. A valve shaft structure for a valve, comprising:
    a body for a valve, a valve shaft, a valve disc disposed within the body so as to be rotatable or capable of ascending and descending, a valve shaft seal chamber having the valve shaft axially attached thereto, a shaft seal packing that is attached to the shaft seal chamber and comprises annular packing bodies stacked and substantially V-shaped in cross section, with stacked layer faces on an inner-diameter side of the packing bodies brought into tight contact with one another and stacked layer faces on an outer-diameter side of the packing bodies formed with prescribed gaps between adjacent stacked layer faces,
    wherein a valley-side apex of each of the packing bodies is deviated from a mountain-side apex of thereof in an outer-diameter direction to make the mountain-side and valley-side apexes eccentric.

6. A shaft seal structure for a valve according to claim 5, wherein a tightening load on the packing bodies and fluid pressure are converted to a force in a diametrical direction owing to inclined angles of stacked layer faces on the inner-diameter side to attain a seal by a surface contact between an inner peripheral surface on an inner-diameter side and an outer peripheral surface of the valve shaft on a sliding side, and a lip part on an outer-diameter side is pushed and spread owing to the gaps to attain a seal by a line contact with the shaft seal chamber on a fixed side.

7. A shaft seal structure for a valve according to claim 5, wherein the valve is a ball valve that has a through hole and is rotatable via the valve shaft, and the valve shaft packing is attached to the valve shaft seal chamber having the valve shaft attached thereto by tightening load given via a gland washer.

8. A shaft seal structure for a valve according to claim 7 wherein the gland washer is a conical disc spring washer and, with the washer, a surface pressure between an outer-diameter side of the shaft seal packing and the shaft seal chamber is capable of being heightened.

9. A shaft seal structure for a valve according to claim 7, wherein the gland washer is attached to the shaft seal so as to prevent the shaft seal packing from being rotated following rotation of the valve shaft.

10. A shaft seal structure for a valve according to claim 8, wherein the gland washer is attached to the shaft seal so as to prevent the shaft seal packing from being rotated following rotation of the valve shaft.

11. A shaft seal packing according to claim 2, wherein a mountain-side angle is a tapered angle of an upper stacked layer face on the outer-diameter side of each of the packing bodies, and is in a range of 42.5° to 50°, a valley-side angle is a tapered angle of a lower stacked layer face on the outer-diameter side thereof, and is in a range of 40° to 47.5°, and a relation of the mountain-side angle>the valley-side angle is satisfied.

12. A shaft seal packing according to claim 2, further comprising a top adapter and a bottom adapter stacked on top and bottom sides of the stacked packing bodies, respectively, to constitute a shaft seal packing and wherein a valley side of the top adapter and a mountain side of the bottom adapter have same angles as the packing bodies.

* * * * *